(12) United States Patent
Mukawa

(10) Patent No.: US 7,944,616 B2
(45) Date of Patent: May 17, 2011

(54) HEAD-MOUNTED DISPLAY

(75) Inventor: Hiroshi Mukawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/543,989

(22) Filed: Aug. 19, 2009

(65) Prior Publication Data

US 2010/0046070 A1 Feb. 25, 2010

(30) Foreign Application Priority Data

Aug. 21, 2008 (JP) ................................. 2008-212684

(51) Int. Cl.
*G02B 27/14* (2006.01)

(52) U.S. Cl. ........................................ 359/630; 359/633

(58) Field of Classification Search .................. 359/630, 359/633
See application file for complete search history.

(56) References Cited

U.S. PATENT DOCUMENTS

2009/0180194 A1* 7/2009 Yamaguchi et al. .......... 359/630

FOREIGN PATENT DOCUMENTS

| JP | 2000-056259 | 2/2000 |
|----|-------------|--------|
| JP | 2002-162598 | 6/2002 |
| JP | 2006162767 | 6/2006 |
| JP | 200794175 | 4/2007 |
| WO | 2005-093493 | 10/2005 |
| WO | 2007-037089 | 4/2007 |
| WO | 2007-062098 | 5/2007 |
| WO | WO 2007/037089 | * 5/2007 |

OTHER PUBLICATIONS

Japanese Office Action for corresponding JP2008-212684 issued on Jul. 20, 2010.

* cited by examiner

*Primary Examiner* — Ricky L Mack
*Assistant Examiner* — James C Jones
(74) *Attorney, Agent, or Firm* — K&L Gates LLP

(57) ABSTRACT

A head-mounted display includes a frame shaped like glasses to be worn on the head of an observer, two image display apparatuses respectively including image generating devices to be placed outside the eyes of the observer, and light guide devices attached to the image generating devices and provided closer to the center of the face of the observer than the image generating devices as a whole, light emitted from the image generating device entering the light guide devices, and being guided and emitted from the light guide devices toward the eyes of the observer, and a coupling member configured to couple the image generating devices and attached to a center portion of the frame between the eyes of the observer.

32 Claims, 14 Drawing Sheets

601

HEAD-MOUNTED DISPLAY

CROSS REFERENCES TO RELATED APPLICATIONS

The present application claims priority to Japanese Priority Patent Application JP 2008-212684 filed in the Japan Patent Office on Aug. 21, 2008, the entire content of which is hereby incorporated by reference.

BACKGROUND

The present application relates to a head-mounted display (HMD) worn on the head of an observer and including a frame shaped like glasses and an image display apparatus.

Japanese Unexamined Patent Application Publication No. 2006-162767 discloses a virtual-image display apparatus (image display apparatus) in which a virtual-image optical system allows an observer to view, as an enlarged virtual image, a two-dimensional image formed by an image forming device.

FIG. 3 is a conceptual view of such an image display apparatus. Referring to FIG. 3, an image display apparatus 100 includes an image forming device 111 having a plurality of pixels arranged in a two-dimensional matrix, a collimating optical system 112 for collimating light emitted from the pixels of the image forming device 111, and a light guide device (optical device) 120 on which the light collimated by the collimating optical system 112 is incident. The incident light is guided and emitted from the light guide device 120. An image generating device 110 is constituted by the image forming device 111 and the collimating optical system 112. The light guide device 120 includes a light guide plate 121, a first deflecting member 130 (e.g., a single-layer light reflective film), and a second deflecting member 140 (e.g., a light reflective multilayer film having a layered structure). Incident light propagates in the light guide plate 121 by total reflection and is then emitted from the light guide plate 121. The first deflecting member 130 reflects the light incident on the light guide plate 121 so that the incident light is totally reflected in the light guide plate 121, and the second deflecting member 140 emits the light, which propagates in the light guide plate 121 by total reflection, from the light guide plate 121.

Further, Japanese Unexamined Patent Application Publication No. 2007-94175 discloses a virtual-image display apparatus (image display apparatus) using a hologram diffraction grating, in which a virtual-image optical system allows an observer to view, as an enlarged virtual image, a two-dimensional image formed by an image forming device.

FIG. 5A is a conceptual view of such an image display apparatus. Referring to FIG. 5A, an image display apparatus 300 basically includes an image forming device 111 for displaying an image, a collimating optical system 112, and a light guide device (optical device) 320 on which the light displayed by the image forming device 111 is incident. Incident light is guided to the eye 41 of the observer. The light guide device 320 includes a light guide plate 321, and first and second diffraction grating members 330 and 340 provided on the light guide plate 321. Each of the first and second diffraction grating members 330 and 340 is formed by a reflective volume hologram diffraction grating. Light emitted from pixels in the image forming device 111 enters the collimating optical system 112, where the light is converted into parallel light, and the parallel light enters the light guide plate 321. The parallel light is incident on and is emitted from a first surface 322 of the light guide plate 321. On the other hand, the first and second diffraction grating members 330 and 340 are mounted on a second surface 323 of the light guide plate 321 parallel to the first surface 322.

The image display apparatus constituted by the image generating device 110 and the light guide device 120 or 320 is attached to a frame shaped like glasses. Specifically, for example, as shown in FIG. 14, two image generating devices 110 are fixed to opposite ends of a front portion 1011 of a frame 1010 shaped like glasses via fixing members 1017 (see FIG. 1 of Japanese Unexamined Patent Application Publication No. 2006-162767).

SUMMARY

In the state shown in FIGS. 14A and 14B, when the observer wears the frame 1010, temple portions 1015 sometimes extend in the directions of arrow A. With this, the front portion 1011 of the frame 1010 deforms in the directions of arrow B. If this phenomenon occurs, the spatial position of an image (virtual image) generated by light emitted from the light guide devices 120 or 320 changes. Particularly when this phenomenon occurs to a binocular head-mounted display, the angle of convergence of right and left images changes. As a result, the preadjusted spatial distance to the virtual image changes, and this makes the observer tired during observation. That is, assuming that the preadjusted spatial position where the screen centers of the right and left virtual images intersect is designated as C, the spatial position shifts from the position C to a position D with deformation of the front portion 1011 of the frame 1010. Consequently, the angle of convergence increases.

To solve this problem, it is conceivable to increase the rigidity of the front portion 1011 of the frame 1010. However, with this solving means, the sectional area of the frame increases, and a material having a high longitudinal elastic modulus is used. This increases the weight of the frame, degrades design, and increases the cost.

It is desirable to provide a head-mounted display that includes a frame shaped like glasses and an image display apparatus, and that is structured so that deformation of the frame caused when the display is worn on the head of an observer does not affect the relative positional relationship between an image obtained by the image display apparatus and the eyes of the observer.

A head-mounted display according to an embodiment includes:

A head-mounted display includes a frame shaped like glasses to be worn on the head of an observer; two image display apparatuses respectively including image generating devices to be placed outside the eyes of the observer, and light guide means attached to the image generating devices and provided closer to the center of the face of the observer than the image generating devices as a whole, light emitted from the image generating devices entering the light guide means, and being guided and emitted from the light guide means toward the eye of the observer; and a coupling member configured to couple the image generating devices, and attached to a center portion of the frame between the eyes of the observer.

In a head-mounted display according to another embodiment, the coupling member couples two light guide means, instead of coupling two image generating devices.

In the head-mounted display of the embodiments, two light guide means are sometimes combined into one. In the head-mounted display of the embodiment, two light guide means are also sometimes combined into one. In this case, the coupling member is attached to the combined light guide means.

This case is also included in the embodiment in which the coupling member couples two light guide means.

In the head-mounted display according to the embodiments, the coupling member couples two image generating devices or light guide means. The coupling member is attached to the center portion of the frame between the two eyes of the observer. Moreover, the image generating devices are provided outside the eyes of the observer. In other words, the image generating devices are not directly attached to the frame. Therefore, when the observer wears the frame on the head, even if temple portions extend outward and the frame is thereby deformed, deformation does not cause displacement of the image generating devices or the light guide means. Even if displacement occurs, it is negligible. For this reason, the angle of convergence of right and left images can be reliably prevented from changing. In addition, since rigidity of the front portion of the frame is not increased, the weight of the frame is not increased, design is not degraded, and the cost is not increased.

Additional features and advantages are described herein, and will be apparent from the following Detailed Description and the figures.

DETAILED DESCRIPTION

Figure 1A:
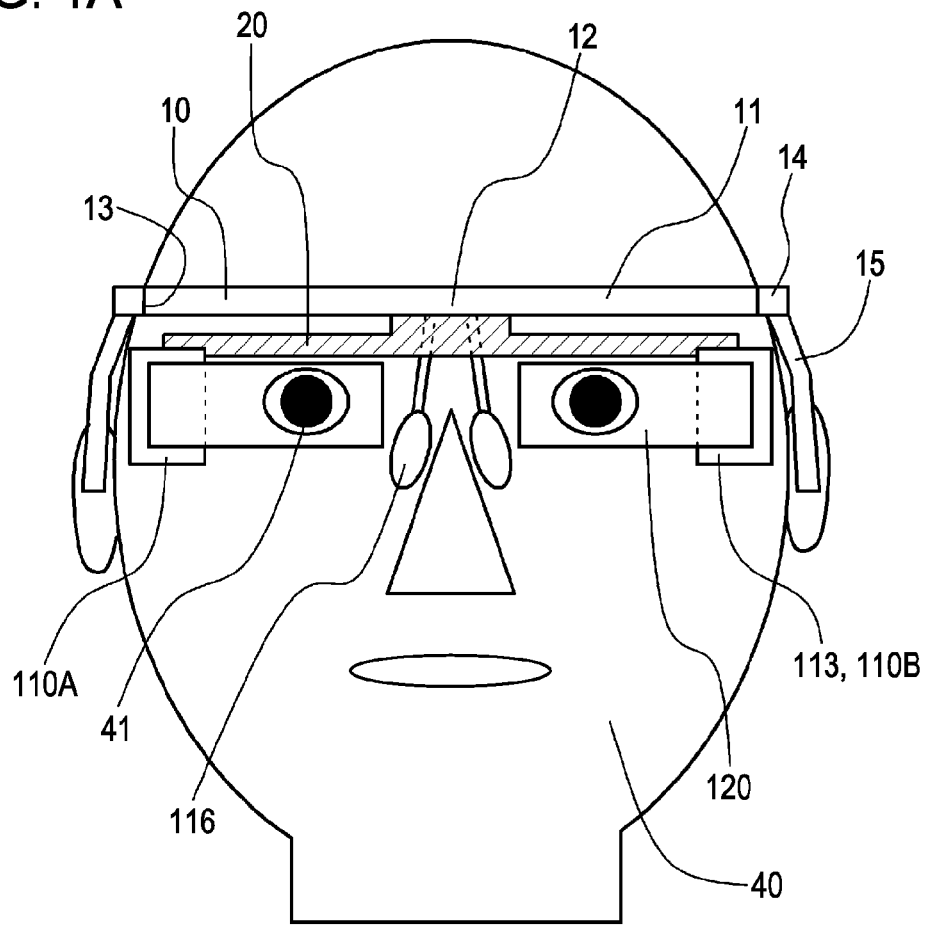
FIGS. 1A and 1B are a schematic front view and a schematic top view, respectively, of a head-mounted display according to Embodiment 1.

The present application will be described in detail below with reference to the drawings according to an embodiment.

Preferably, a head-mounted display according to an embodiment satisfies conditions that $0.01 \times L \leq \alpha \leq 0.30 \times L$, preferably, $0.05 \times L \leq \alpha \leq 0.25 \times L$, $0.35 \times L \leq \beta \leq 0.65 \times L$, preferably, $0.45 \times L \leq \beta \leq 0.55 \times L$, and $0.70 \times L \leq \gamma \leq 0.99 \times L$, preferably, $0.75 \times L \leq \gamma \leq 0.95 \times L$, where $\alpha$ represents the distance between the mounting center of one image generating device and one end (one endpiece) of a frame, $\beta$ represents the distance between the center of a coupling member and the one end (the one endpiece) of the frame, $\gamma$ represents the distance between the mounting center of the other image generating device and the one end (the one endpiece) of the frame, and L represents the length of the frame. Preferably, a head-mounted display according to another embodiment satisfies the condition that $0.35 \times L \leq \beta \leq 0.65 \times L$, preferably, $0.45 \times L \leq \beta \leq 0.55 \times L$, where $\beta$ represents the distance between the center of a coupling member and one end of a frame and L represents the length of the frame. When $\alpha'$ represents the distance between the center of one image generating device and the one end of the frame and $\gamma'$ represents the distance between the center of the other image generating device and the one end of the frame, it is preferable that the values $\alpha'$ and $\gamma'$ be similar to the above-described values $\alpha$ and $\gamma$.

Here, the mounting center of the image generating device or the center of the image generating device refers to a bisection point, along the axis of the frame, of an overlapping portion between a projected image of the image generating device and a projected image of the frame obtained by projecting the image generating device and the frame onto a virtual plane in a state in which the image generating device is attached to the coupling member or the light guide device. The center of the coupling member refers to a bisection point, along the axis of the frame, of a portion of the coupling member that is in contact with the frame in a state in which the coupling member is attached to the frame. The length of the frame refers to the length of the projected image of the frame when the frame is curved. Further, the projecting direction is perpendicular to the face of the observer.

In the head mounted display according to the embodiments, the light guide device includes:

(a) a light guide plate which is provided at a position closer to the center of the face of the observer than the image generating device as a whole, light emitted from the image generating device being incident on the light guide plate, and being guided and emitted from the light guide plate toward the eye of the observer;

(b) a first deflecting member for polarizing the light incident on the light guide plate so that the incident light is totally reflected in the light guide plate; and (c) a second deflecting member for polarizing the light, which has propagates in the light guide plate by total reflection, a plurality of times so as to emit the propagating light.

The term "total reflection" refers to total internal reflection or total reflection in the light guide plate. This also applies to the following.

In this structure, the first deflecting member can reflect the light incident on the light guide plate, and the second deflecting member can transmit and reflect the light, which propagates in the light guide plate by total reflection, a plurality of times. In this case, the first deflecting member can function as a reflecting mirror, and the second deflecting member can function as a semi-transmissive mirror.

In this configuration, the first deflecting member can be formed, for example, by a light reflecting film (a kind of mirror) made of metal including an alloy and configured to reflect the light incident on the light guide plate, or a diffraction grating (e.g., a hologram diffraction grating film) for diffracting the light incident on the light guide plate. The second deflecting member can be formed by a multilayer structure in which multiple dielectric films are stacked, a half mirror, a polarizing beam splitter, or a hologram diffraction grating film. While the first deflecting member and the second deflecting member are provided (incorporated) in the light guide plate, the first deflecting member reflects or diffracts parallel light incident on the light guide plate so that the incident parallel light is totally reflected in the light guide plate. In contrast, the second deflecting member reflects or diffracts the parallel light, which propagates in the light guide plate by total reflection, a plurality of times, and emits the parallel light from the light guide plate.

Alternatively, the first deflecting member can diffract the light incident on the light guide plate, and the second deflecting member can diffract the light, which propagates in the light guide plate by total reflection, a plurality of times. In this case, the first deflecting member and the second deflecting member each can be formed by a diffraction grating element. Further, the diffraction grating element can be formed by a reflective diffraction grating element or a transmissive diffraction grating element. Alternatively, one of the diffraction grating elements can be formed by a reflective diffraction grating element, and the other diffraction grating element can be formed by a transmissive diffraction grating element. An example of the reflective diffraction grating element is a reflective volume hologram diffraction grating. For convenience, the first deflecting member formed by a reflective volume hologram diffraction grating is sometimes referred to as a "first diffraction grating member", and the second deflecting member formed by a reflective volume hologram diffraction grating is sometimes referred to as a "second diffraction grating member".

To diffract or reflect a P-number of (e.g., three corresponding to red, green, and blue) types of light beams having a P-number of different wavelength bands (or wavelengths), in the first diffraction grating member or the second diffraction grating member, a P-number of diffraction grating layers, each formed by a reflective volume hologram diffraction grating, can be stacked. Each diffraction grating layer is provided with interference fringes corresponding to one wavelength band (or wavelength). Alternatively, to diffract or reflect a P-number of types of light beams having a P-number of different wavelength bands (or wavelengths), the first diffraction grating member or the second diffraction grating member can be formed by one diffraction grating layer that is provided with a P-number of types of interference fringes. Further alternatively, for example, the angle of view can be divided into three parts, and the first diffraction grating member or the second diffraction grating member can be formed by stacking diffraction grating layers corresponding to the parts of the angle of view. By adopting these structures, it is possible to increase the diffraction efficiency and acceptable diffraction angle and to optimize the diffraction angle when the light beams having the wavelength bands (or wavelengths) are diffracted or reflected by the first diffraction grating member or the second diffraction grating member.

For example, the first diffraction grating member and the second diffraction grating member can be formed of a photopolymer material. The material and basic structure of the first diffraction grating member and the second diffraction grating member formed by the reflective volume hologram diffraction gratings may be the same as those of the reflective volume hologram diffraction gratings in the related art. Here, the reflective volume hologram diffraction grating refers to a hologram diffraction grating that diffracts and reflects only +1-order diffracted light. While the diffraction grating member is provided with interference fringes extending from the inner side to the outer side of the diffraction grating member, a formation method for the interference fringes may be the same as that adopted in the related art. More specifically, for example, the material that forms the diffraction grating member (e.g., a photopolymer material) is irradiated with object light in a first predetermined direction, and is simultaneously irradiated with reference light in a second predetermined direction, whereby the object light and the reference light form interference fringes in the material that forms the diffraction grating member. By appropriately selecting the first predetermined direction, the second predetermined direction, and the wavelengths of the object light and the reference light, the interference fringes can be arranged at a desired pitch with a desired slant angle on the surfaces of the diffraction grating member. Here, the slant angle of the interference fringes refers to the angle formed between the surfaces of the diffraction grating member (or the diffraction grating layer) and the interference fringes. When the first diffraction grating member and the second diffraction grating member are formed to have a layered structure in which a P-number of diffraction grating layers, each formed by a reflective volume hologram diffraction grating, are stacked, a P-number of diffraction grating layers are separately formed, and are then stacked (bonded) with, for example, an ultraviolet curing resin adhesive. Alternatively, a P-number of diffraction grating layers may be formed by forming one diffraction grating layer of an adhesive photopolymer material, and then bonding layers of an adhesive photopolymer material thereon in order.

In the head-mounted display according to an embodiment, the light guide device can be formed by a semi-transmissive mirror which is provided at a position closer to the center of the face of the observer than the image generating device, on which light emitted from the image generating device is incident, and from which the light is emitted toward the eye of the observer. The light emitted from the image generating device can enter the semi-transmissive mirror after propagating in the air, or after propagating in a transparent member such as a glass plate or a plastic plate (specifically, a member formed of a material similar to a material that forms the light guide plate, which will be described below). The semi-transmissive mirror may be attached to the image generating device via the transparent member or via a member different from the transparent member.

In the head-mounted displays including the above-described preferred embodiments, the image generating device can include:

(a) an image forming device including a plurality of pixels arranged in a two-dimensional matrix; and (b) a collimating optical system that emits, as parallel light, light emitted from the pixels in the image forming device.

For convenience, the image generating device having this structure is referred to as an image generating device having a first structure.

In the image generating device having the first structure, for example, the image forming device can be formed by an image forming device including a reflective spatial light modulator and a light source, an image forming device including a transmissive spatial light modulator and a light source, or an image forming device including a light emitting element such as an organic EL (Electro Luminescence) element, an inorganic EL element, or a light emitting diode (LED). Especially, it is preferable that the image forming device include a reflective spatial light modulator and a light source. For example, the spatial light modulator can be formed by a light valve, a transmissive or reflective liquid crystal display such as an LCOS (Liquid Crystal On Silicon), or a digital micromirror device (DMD), and the light source can be formed by a light emitting element. Further, the reflective spatial light modulator can include a liquid crystal display and a polarizing beam splitter that reflects part of light from the light source to the liquid crystal display and transmits part of the light reflected by the liquid crystal display to a collimating optical system. The light emitting element that forms the light source includes, for example, a red light emitting element, a green light emitting element, a blue light emitting element, and a white light emitting element. The light emitting element can be formed by a semiconductor laser element or an LED. The number of pixels can be determined according to the specifications of the head-mounted display. For example, a concrete number of pixels is 320×240, 432×240, 640×480, 1024×768, or 1920×1080.

Alternatively, in the head-mounted displays according to the above-described preferred embodiments, the image generating device can include:

(a) a light source;

(b) a collimating optical system that converts light emitted from the light source into parallel light;

(c) a scanning member that scans the parallel light emitted from the collimating optical system; and (d) a relay optical system that relays and emits the parallel light scanned by the scanning member.

For convenience, the image generating device having this structure is referred to as an image generating device having a second structure.

The light source in the image generating device having the second structure can include a light emitting element, more specifically, a red light emitting element, a green light emitting element, a blue light emitting element, and a white light emitting element. For example, the light emitting element can be formed by a semiconductor laser element or an LED. The number of pixels (virtual pixels) in the image generating device having the second structure can also be determined according to the specifications of the head-mounted display. For example, a concrete number of pixels is 320×240, 432×240, 640×480, 1024×768, or 1920×1080. When the light source includes a red light emitting element, a green light emitting element, and a blue light emitting element, for example, it is preferable to perform color synthesis using a crossed prism. The scanning member can be formed by a MEMS (Micro Electro Mechanical system) having a micromirror rotatable in the two-dimensional direction, or a galvanometer mirror, which scans light emitted from the light source horizontally and vertically. The relay optical system can be formed by a relay optical system of the related art.

Besides the image forming device including a light emitting element and a light valve, or the image forming device including, as a light source, a combination of a backlight for emitting white light as a whole and a liquid crystal display having red, green, and blue light emitting pixels, the following structures can be given as examples.

Image Forming Device A

An image forming device A includes:

(a) a first image forming unit formed by a first light emitting panel in which first light emitting elements for emitting blue light are arranged in a two-dimensional matrix;

(b) a second image forming unit formed by a second light emitting panel in which second light emitting elements for emitting green light are arranged in a two-dimensional matrix;

(c) a third image forming unit formed by a third light emitting panel in which third light emitting elements for emitting red light are arranged in a two-dimensional matrix; and (d) a combining unit that combines the optical paths of light emitted from the first, second, and third image forming units into one optical path (e.g., a dichroic prism, this also applies to the following description).

The image forming device A controls a light-emitting/non-light-emitting state of each of the first, second, and third light emitting elements.

Image Forming Device B

An image forming device B includes:

(a) a first image forming unit including a first light emitting element for emitting blue light, and a first light transmission control unit for controlling transmission/non-transmission of the blue light emitted from the first light emitting element (the first light transmission control unit is a kind of light valve, and includes, for example, a liquid crystal display, a digital micromirror device (DMD), and an LCOS, this also applies to the following description);

(b) a second image forming unit including a second light emitting element for emitting green light, and a second light transmission control unit (light valve) for controlling transmission/non-transmission of the green light emitted from the second light emitting element;

(c) a third image forming unit including a third light emitting element for emitting red light, and a third light transmission control unit (light valve) for controlling transmission/non-transmission of the red light emitted from the third light emitting element; and (d) a combining unit that combines the optical paths of light passing through the first, second, and third light transmission control units into one optical path.

The image forming device B displays an image by controlling transmission/non-transmission of the light emitted from the light emitting elements by the light transmission control units. As devices (light guide members) for guiding the light emitted from the first, second, and third light emitting elements to the light transmission control units, for example, optical waveguides, microlens arrays, mirrors, reflective plates, or light-collecting lenses can be used.

Image Forming Device C

An image forming device C includes:

(a) a first image forming unit including a first light emitting panel in which first light emitting elements for emitting blue light are arranged in a two-dimensional matrix, and a blue light transmission control unit (light valve) that controls transmission/non-transmission of the blue light emitted from the first light emitting panel;

(b) a second image forming unit including a second light emitting panel in which second light emitting elements for emitting green light are arranged in a two-dimensional matrix, and a green light transmission control unit (light valve) that controls transmission/non-transmission of the green light emitted from the second light emitting panel;

(c) a third image forming unit including a third light emitting panel in which third light emitting elements for emitting red light are arranged in a two-dimensional matrix, and a red light transmission control unit (light valve) that controls transmission/non-transmission of the red light emitted from the third light emitting panel; and (d) a combining unit that combines the optical paths of the light passing through the blue, green, and red light transmission control units into one optical path.

The image forming device C displays an image by controlling transmission/non-transmission of the light emitted from the first, second, and third light emitting panels by the light transmission control units (light valves).

Image Forming Device D

An image forming device D is a color-display image forming device of a field sequential type. The image forming device D includes:

(a) a first image forming unit including a first light emitting element for emitting blue light;

(b) a second image forming unit including a second light emitting element for emitting green light;

(c) a third image forming unit including a third light emitting element for emitting red light;

(d) a combining unit that combines the optical paths of the light emitted from the first, second, third image forming units into one optical path; and (e) a light transmission control unit (light valve) that controls transmission/non-transmission of the light emitted from the combining unit.

The image forming device D displays an image by controlling transmission/non-transmission of the light emitted from these light emitting elements by the light transmission control unit.

Image Forming Device E

An image forming device E is also a color display image forming device of a field sequential type. The image forming device E includes:

(a) a first image forming unit including a first light emitting panel in which first light emitting elements for emitting blue light are arranged in a two-dimensional matrix;

(b) a second image forming unit including a second light emitting panel in which second light emitting elements for emitting green light are arranged in a two-dimensional matrix;

(c) a third image forming unit including a third light emitting panel in which third light emitting elements for emitting red light are arranged in a two-dimensional matrix;

(d) a combining unit that combines the optical paths of the light emitted from the first, second, third image forming units into one optical path; and (e) a light transmission control unit (light valve) that controls transmission/non-transmission of the light emitted from the combining unit.

The image forming device E displays an image by controlling transmission/non-transmission of the light emitted from these light emitting panels by the light transmission control unit.

Image Forming Device F

An image forming device F is a color-display image forming device of a passive or active matrix type that displays an image by controlling light-emitting/non-light-emitting states of first, second, and third light emitting elements.

Image Forming Device G

An image forming device G is a color-display image forming device of a field sequential type. The image forming device G includes a light transmission control unit (light valve) that controls transmission/non-transmission of light emitted from light emitting element units arranged in a two-dimensional matrix. The image forming device G displays an image by controlling light-emitting/non-light-emitting states of first, second, and third light emitting elements in the light emitting element units in a time division manner, and by controlling transmission/non-transmission of light emitted from the first, second, and third light emitting elements by the light transmission control unit.

In the image generating device having the first structure or the image generating device having the second structure, a plurality of parallel light beams collimated by the collimating optical system are caused to enter the light guide plate. The reason why the light beams are to be parallel light beams is based on the fact that wavefront information obtained when the light beams enter the light guide plate is stored even after the light beams are emitted from the light guide plate via the first deflecting member and the second deflecting member. To generate a plurality of parallel light beams, for example, the image forming device is placed at a position corresponding to the focal length of the collimating optical system. The collimating optical system serves to convert positional information of pixels into angular information in the optical system of the light guide device. For example, the collimating optical system can be formed by an optical system which has a positive optical power as a whole and which includes a convex lens, a concave lens, an adjustable surface prism, or a hologram lens alone or a combination of these.

The light guide plate has two parallel surfaces (first and second surfaces) extending parallel to the axis (Y-direction) of the light guide plate. Assuming that a surface of the light guide plate on which light is incident is an incident surface and a surface of the light guide plate from which light is emitted is an exit surface, both the incident surface and the exit surface may be defined by the first surface, or the incident surface may be defined by the first surface and the exit surface may be defined by the second surface. For example, the light guide plate can be formed of a glass material including optical glass such as quartz glass or BK7, or a plastic material (e.g., PMMA, polycarbonate resin, acrylic resin, amorphous polypropylene resin, or styrene resin including AS resin). The light guide plate is not limited to a flat plate, and may be curved.

In the above-described head-mounted displays according to the preferred embodiments, the frame can include a front portion to be placed at the front of the observer; and two temple portions pivotally attached to opposite ends of the front portion via hinges. The coupling member can be attached to a center portion of the front portion (corresponding to a bridge of ordinary glasses) between two eyes of the observer.

Nose pads are provided in the center portion of the front portion. That is, in the embodiments, the frame has almost the same structure as that of ordinary glasses except that rims are not provided. The frame can be formed of the same material as that of ordinary glasses, for example, metal, an alloy, plastic, or a combination of these. The shape of the coupling member can be substantially arbitrary, and for example, the coupling member can be shaped like a rod or a long and narrow plate. The coupling member can also be formed by, for example, metal, an alloy, plastic, or a combination of these. Alternatively, nose pads may be provided in a center portion of the coupling member.

Embodiment 1

Figure 1B:
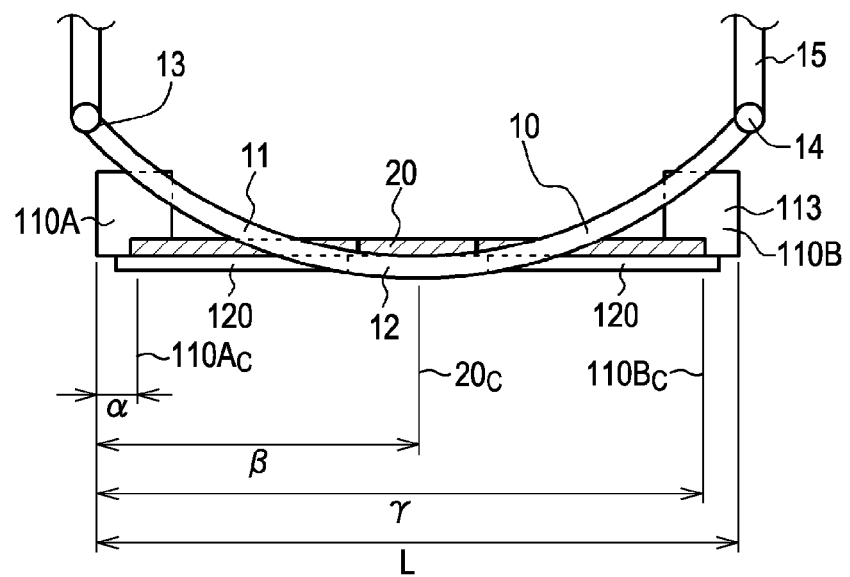
Figure 2:
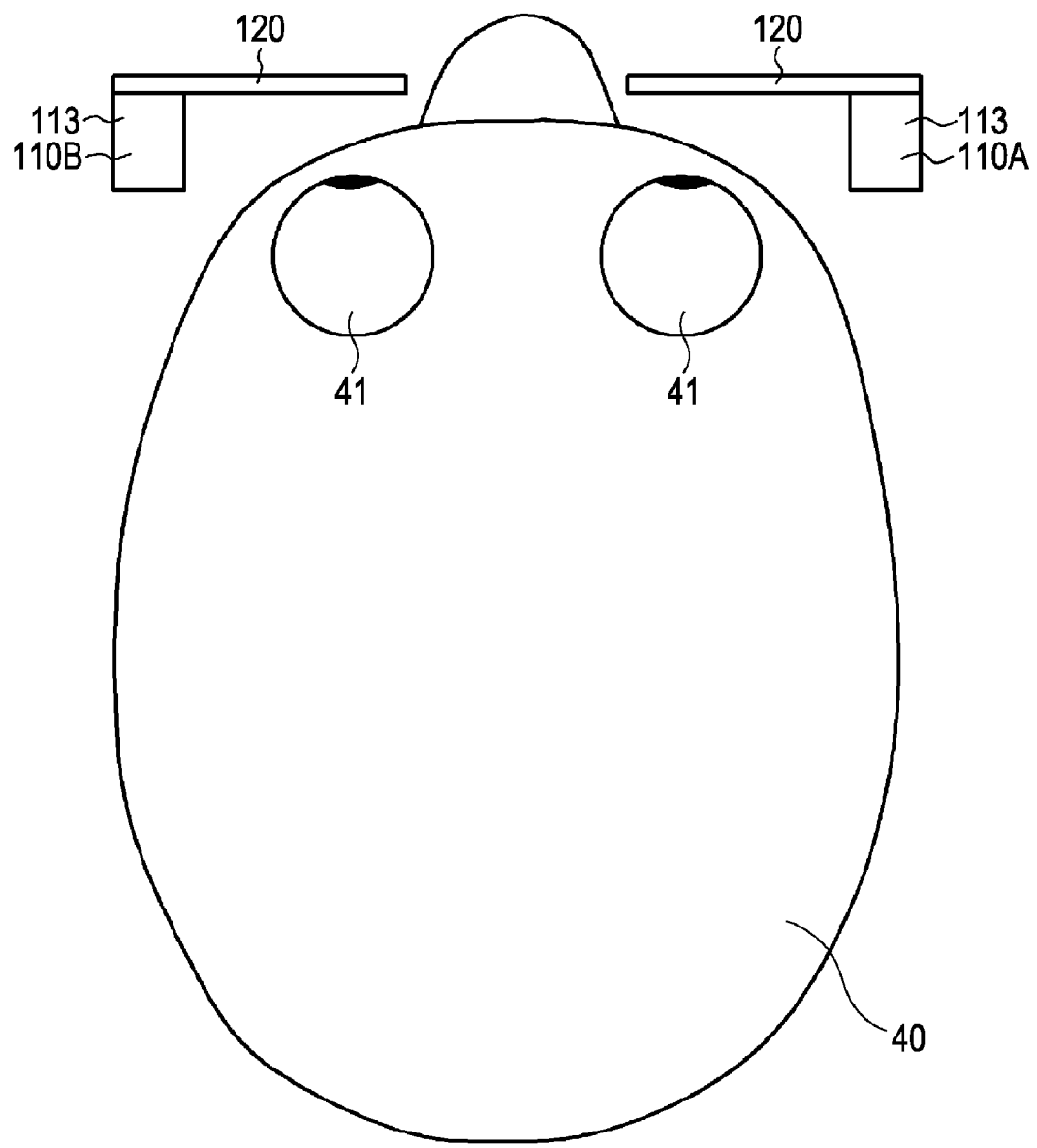
FIG. 2 is a top view showing a state in which the head-mounted display of Embodiment 1 is worn on the head of an observer (only image display apparatuses are shown, but a frame is not shown)
Figure 3:
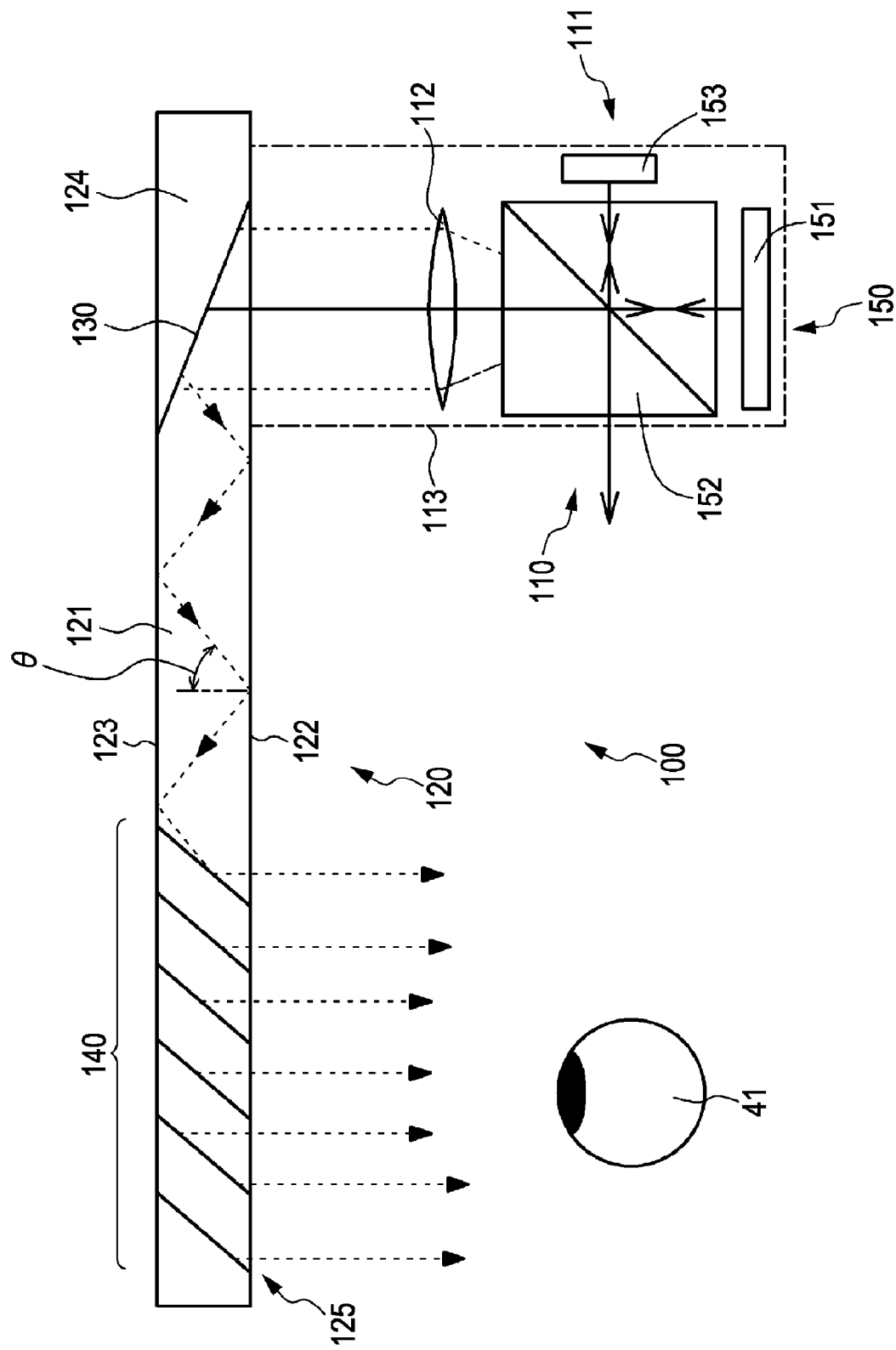
FIG. 3 is a conceptual view of an image display apparatus in the head-mounted display of Embodiment 1.

FIGS. 1A and 1B are a schematic front view and a schematic top view, respectively, of a head-mounted display according to Embodiment 1. FIG. 2 is a top view showing a state in which the head-mounted display of Embodiment 1 is worn on the head of an observer 40. In FIG. 2, for convenience, only image display apparatuses are shown, but a frame is not shown. FIG. 3 is a conceptual view of the image display apparatus in the head-mounted display of Embodiment 1.

The head-mounted display of Embodiment 1 includes:

(A) a frame 10 that is to be worn on the head of the observer 40 and is shaped like glasses; and (B) two image display apparatuses 100.

Each image display apparatus 100 includes:

(B-1) an image generating device 110 (110A, 110B) formed by an image generating device having a first structure; and (B-2) a light guide device 120 attached to the image generating device 110, placed at a position closer to the center of the face of the observer 40 than the image generating device 110 as a whole, light emitted from the image generating device 110 entering the light guide device 120 and being guided and emitted from the light guide device 120 toward the eye 41 of the observer 40.

The head-mounted display of Embodiment 1 also includes a coupling member 20 that couples the two image generating devices 110A and 110B. The coupling member 20 is attached to a center portion 12 of the frame 10 between the eyes 41 of the observer 40, for example, with screws or an adhesive (not shown). The image generating devices 110A and 110B are provided outside the eyes 41 of the observer 40, and are attached to opposite ends of the coupling member 20, for example, with screws or an adhesive (not shown). In FIGS. 1A, 1B, 7A, 7B, 8A, and 8B, the coupling member 20 (or 30) is diagonally shaded such as to be clearly expressed.

Figure 7A:
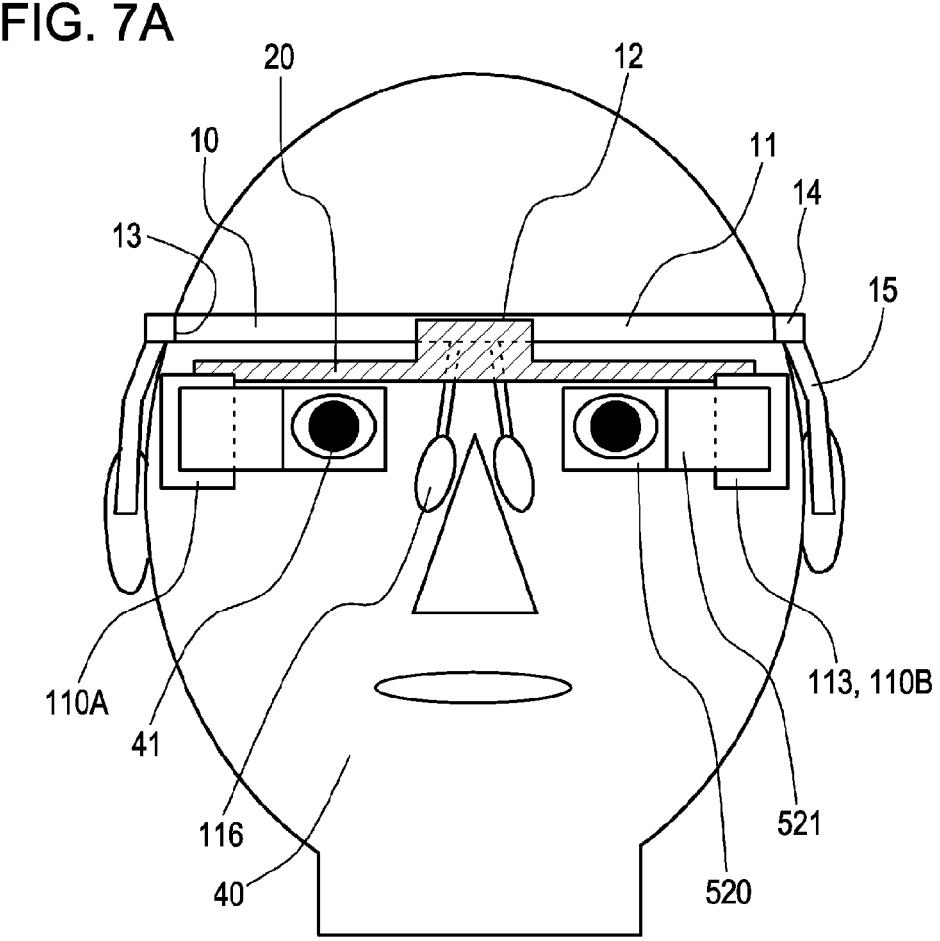
FIGS. 7A and 7B are a schematic front view and a schematic top view, respectively, of a head-mounted display according to Embodiment 5.
Figure 7B:
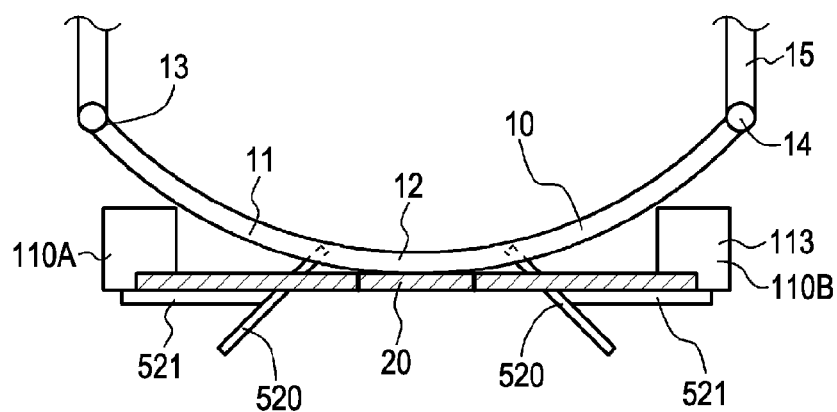

The frame 10 includes a front portion 11 to be provided in front of the observer 40, and two temple portions 15 pivotally attached to opposite ends of the front portion 11 via hinges 14. The coupling member 20 is attached to a center portion 12 (corresponding to a bridge of ordinary glasses) of the front portion 11 between the eyes 41 of the observer 40. Nose pads 16 are attached to the center portion 12 of the front portion 11. In FIG. 1B, 7B, or 8B, illustration of the nose pads 16 is omitted. The frame 10 and the coupling member 20 are formed of metal or plastic. The coupling member 20 is shaped like a rod.

More specifically, the following conditions are satisfied:

$\alpha = 0.1 \times L$ $\beta = 0.5 \times L$, and $\gamma = 0.9 \times L$ where $\alpha$ represents the distance from a mount center 110AC of one image generating device 110A to one end (one endpiece) 13 of the frame 10, $\beta$ represents the distance from the center 20C of the coupling member 20 to the end 13 of the frame 10, $\gamma$ represents the distance from a mount center 110BC of the other image generating device 110B to the end 13 of the frame 10, and L represents the length of the frame 10.

In Embodiment 1, as shown in FIG. 3, the light guide device 120 includes:

(a) a light guide plate 121 provided at a position closer to the center of the face of the observer 40 than the image generating device 110 as a whole, light emitted from the image generating device 110 entering the light guide plate 121 and being guided and emitted from the light guide plate 121 toward the eye 41 of the observer 40;

(b) a first deflecting member 130 that deflects the light incident on the light guide plate 121 so that the incident light is totally reflected in the light guide plate 121; and (c) a second deflecting member 140 that deflects the light, which propagates in the light guide plate 121 by total reflection, a plurality of times so as to emit the light from the light guide plate 121.

The first deflecting member 130 and the second deflecting member 140 are provided in the light guide plate 121. The first deflecting member 130 reflects light incident on the light guide plate 121, and the second deflecting member 140 transmits and reflects the light, which propagates in the light guide plate 121 by total reflection, a plurality of times. In other words, the first deflecting member 130 functions as a reflecting mirror, and the second deflecting member 140 functions as a semi-transmissive mirror. More specifically, the first deflecting member 130 provided in the light guide plate 121 is formed by a light reflecting film (a kind of mirror) made of aluminum and configured to reflect light incident on the light guide plate 121. In contrast, the second deflecting member 140 provided in the light guide plate 121 is formed by a layered structure in which multiple dielectric films are stacked. The dielectric films include, for example, a TiO2 film made of a high dielectric constant material and a SiO2 film made of a low dielectric constant material. The layered structure in which multiple dielectric films are stacked is disclosed in Japanese Unexamined Patent Application Publication (Translation of PCT Application) No. 2005-521099. While six dielectric films are shown in the figure, the number of dielectric films is not limited thereto. Thin pieces made of the same material as that of the light guide plate 121 are provided between the dielectric films. The first deflecting member 130 reflects (or diffracts) parallel light incident on the light guide plate 121 so that the incident light is totally reflected in the light guide plate 121. In contrast, the second deflecting member 140 reflects (or diffracts) the parallel light, which propagates in the light guide plate 121 by total reflection, a plurality of times, and emits the parallel light from the light guide plate 121.

An inclined surface where the first deflecting member 130 is to be formed is formed in the light guide plate 121 by cutting out a portion 124 of the light guide plate 121, a light reflective film is formed on the inclined surface by vacuum deposition, and the cut portion 124 of the light guide plate 121 is then bonded to the first deflecting member 130. Further, a layered structure, in which multiple layers made of the same material (e.g., glass) as that of the light guide plate 121 and multiple dielectric films (for example, formed by vacuum deposition) are stacked, is formed, an inclined surface is formed by cutting out a portion 125 of the light guide plate 121 where the second deflecting member 140 is to be formed, the layered structure is bonded to the inclined surface, and the outer side of the light guide plate 121 of the second deflecting member 140 is shaped by, for example, polishing. Thus, the light guide device 120 in which the first deflecting member 130 and the second deflecting member 140 are provided can be obtained.

The light guide plate 121 formed of optical glass or a plastic material has two parallel surfaces (first surface 122 and second surface 123) extending parallel to the axis of the light guide plate 121. The first surface 122 and the second surface 123 face each other. Parallel light enters from the first surface 122 serving as a light incident surface, propagates in the light guide plate 121 by total reflection, and is then emitted from the first surface 122 serving as a light exit surface.

Referring to FIG. 3, each image generating device 110 includes:

(a) an image forming device 111 including a plurality of pixels arranged in a two-dimensional matrix; and (b) a collimating optical system 112 that emits, as parallel light, light emitted from the pixels in the image forming device 111.

The image generating device 110 is entirely stored in a housing 113 (shown by a one-dot chain line in FIG. 3). The housing 113 has an opening (not shown), through which light is emitted from the collimating optical system 112. Two housings 113 are attached to opposite ends of the coupling member 20 with screws or an adhesive (not shown). The light guide device 120 is also attached to the housing 113.

The image forming device 111 includes a reflective spatial light modulator 150 and a light source 153 formed by a light emitting diode for emitting white light. More specifically, the reflective spatial light modulator 150 includes a liquid crystal display (LCD) 151 formed by an LCOS serving as a light valve, and a polarizing beam splitter 152 that reflects part of light from the light source 153 to the liquid crystal display 151 and transmits part of the light reflected by the liquid crystal display 151 so as to guide the reflected part to the collimating optical system 112. The liquid crystal display 151 includes a plurality of (e.g., 320×240) pixels (liquid crystal cells) arranged in a two-dimensional matrix. The polarizing beam splitter 152 has the same structure as that of the related art. Unpolarized light emitted from the light source 153 impinges on the polarizing beam splitter 152. P-polarized light components pass through the polarizing beam splitter 152, and are emitted therefrom. In contrast, S-polarized light components are reflected by the polarizing beam splitter 152, enter the liquid crystal display 151, are reflected by the inner side of the liquid crystal display 151, and are then emitted from the liquid crystal display 151. Here, light emitted from pixels for displaying white, of light emitted from the liquid crystal display 151, contains many P-polarized light components, and light emitted from pixels for displaying black contains many S-polarized light components. Therefore, P-polarized light components, of the light that is emitted from the liquid crystal display 151 and impinges on the polarizing beam splitter 152, pass through the polarizing beam splitter 152, and are guided to the collimating optical system 112. In contrast, S-polarized light components are reflected by the polarizing beam splitter 152, and return to the light source 153. The liquid crystal display 151 includes a plurality of (e.g., 320×240) pixels (the number of liquid crystal cells is three times the number of pixels) arranged in a two-dimensional matrix. The collimating optical system 112 is formed by, for example, a convex lens. To generate parallel light, the image forming device 111 (concretely, the liquid crystal display 151) is placed at a position corresponding to the focal length of the collimating optical system 112. One pixel is defined by a red light emitting sub-pixel for emitting red light, a green light emitting sub-pixel for emitting green light, and a blue light emitting sub-pixel for emitting blue light.

In this way, in the head-mounted display (HMD) of Embodiment 1, the coupling member 20 couples two image generating devices 110A and 110B, and is attached to the center portion 12 of the frame 10 between the eyes 41 of the observer 40. Moreover, the image generating devices 110A and 110B are provided outside the eyes 41 of the observer 40, and are attached to the frame 10 via the coupling member 20. Therefore, when the observer 40 wears the frame 10 on the head, even if the temple portions 15 extend outward and the frame 10 is thereby deformed, deformation does not cause displacement of the image generating devices 110A and 110B. Even if displacement occurs, it is negligible. For this reason, the angle of convergence of right and left images can be reliably prevented from changing. In addition, since rigidity of the front portion 11 of the frame 10 is not increased, the weight of the frame 10 is not increased, design is not degraded, and the cost is not increased.

Embodiment 2

Figure 4:
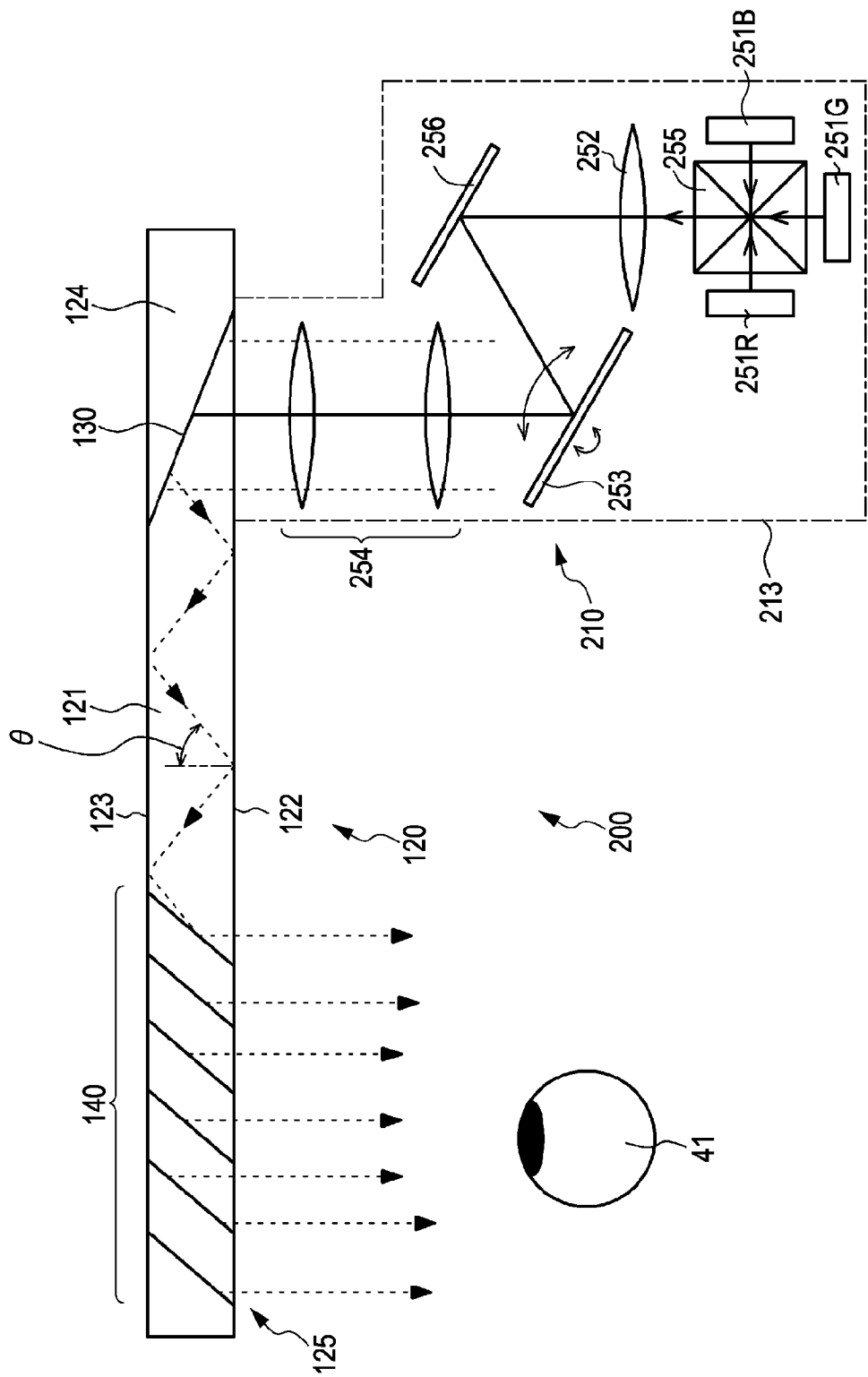
FIG. 4 is a conceptual view of an image display apparatus in a head-mounted display according to Embodiment 2.

Embodiment 2 is a modification of Embodiment 1. FIG. 4 is a conceptual view of an image display apparatus 200 in a head-mounted display according to Embodiment 2. As shown in FIG. 4, an image generating device 210 in Embodiment 2 is formed by an image generating device having a second structure. More specifically, the image generating device 210 includes:

(a) a light source 251;

(b) a collimating optical system 252 that converts light emitted from the light source 251 into parallel light;

(c) a scanning member 253 that scans the parallel light emitted from the collimating optical system 252; and (d) a relay optical system 254 that relays and emits the parallel light scanned by the scanning member 253. The image generating device 210 is entirely stored in a housing 213 (shown by a one-dot chain line in FIG. 4).

The housing 213 has an opening (not shown), through which light is emitted from the relay optical system 254. Two housings 213 are attached to opposite ends of a coupling member 20 with screws or an adhesive (not shown). Further, a light guide device 120 is attached to the housing 213.

The light source 251 includes a red light emitting element 251R for emitting red light, a green light emitting element 251G for emitting green light, and a blue light emitting element 251B for emitting blue light. Each of the light emitting elements is formed by a semiconductor laser element. Light beams of three primary colors emitted from the light source 251 pass through a crossed prism 255, where optical paths thereof are combined into one optical path by color synthesis. The light emitted from the crossed prism 255 enters the collimating optical system 252 having a positive optical power as a whole, and is emitted as parallel light. The parallel light is reflected by a total reflection mirror 256, is horizontally and vertically scanned by the scanning member 253 formed by an MEMS that rotates a micromirror in a two-dimensional direction so as to two-dimensionally scan the incident parallel light, and is converted into a kind of two-dimensional image, whereby virtual pixels are generated. The light from the virtual pixels passes through the relay optical system 254 formed by a relay optical system of the related art, and enters the light guide device 120 as parallel light.

The parallel light from the relay optical system 254 enters the light guide device 120, and is guided therein, and emitted therefrom. Since the light guide device 120 has the same structure as that of the light guide device adopted in Embodiment 1, a detailed description thereof is omitted. Further, since the head-mounted display of Embodiment 2 substantially has the same structure as that of the head-mounted display of Embodiment 1 except that the image generating device 210 is different, as described above, a detailed description thereof is omitted.

Embodiment 3

Figure 5:
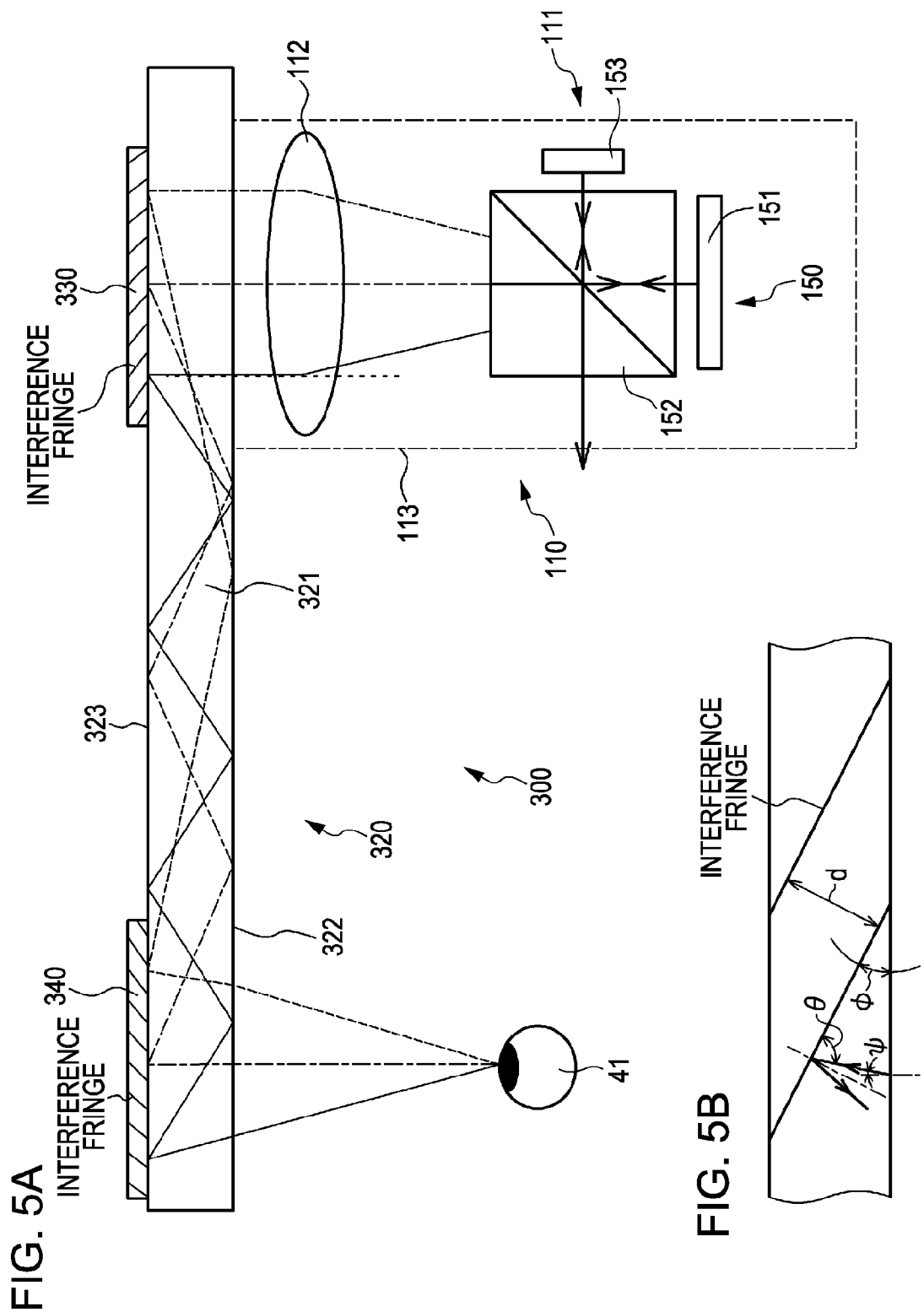
FIG. 5A is a conceptual view of an image display apparatus in a head-mounted display according to Embodiment 3.
FIG. 5B is an enlarged schematic sectional view of a part of a reflective volume hologram diffraction grating.

Embodiment 3 is also a modification of Embodiment 1. FIG. 5A is a conceptual view of an image display apparatus 300 in a head-mounted display according to Embodiment 3. FIG. 5B is an enlarged schematic sectional view of a part of a reflective volume hologram diffraction grating. In Embodiment 3, an image generating device 110 is formed by an image generating device having a first structure, similarly to Embodiment 1. A light guide device 320 has the same basic structure as that of the light guide device 120 of Embodiment 1 except in structures of a first deflecting member and a second deflecting member. That is, the light guide device 320 includes:

(a) a light guide plate 321 provided at a position closer to the center of the face of an observer 40 than the image generating device 110 as a whole, light emitted from the image generating device 110 entering the light guide plate 321, and being guided and emitted toward the eye 41 of the observer 40;

(b) a first deflecting member that deflects the light incident on the light guide plate 321 so that the incident light is totally reflected in the light guide plate 321; and (c) a second deflecting member that deflects the light, which propagates in the light guide plate 321 by total reflection, a plurality of times so as to emit the light from the light guide plate 321.

In Embodiment 3, the first deflecting member and the second deflecting member are provided on a surface of the light guide plate 321 (concretely, a second surface 323 of the light guide plate 321). The first deflecting member diffracts light incident on the light guide plate 321, and the second deflecting member diffracts the light, which propagates in the light guide plate 321 by total reflection, a plurality of times. Each of the first and second deflecting members is formed by a diffraction grating element, specifically, a reflective diffraction grating element, and more specifically, a reflective volume hologram diffraction grating. In the following description, for convenience, the first deflecting member formed by a reflective volume hologram diffraction grating is referred to as a "first diffraction grating member 330", and the second deflecting member formed by a reflective volume hologram diffraction grating is referred to as a "second diffraction grating member 340".

Figure 6:
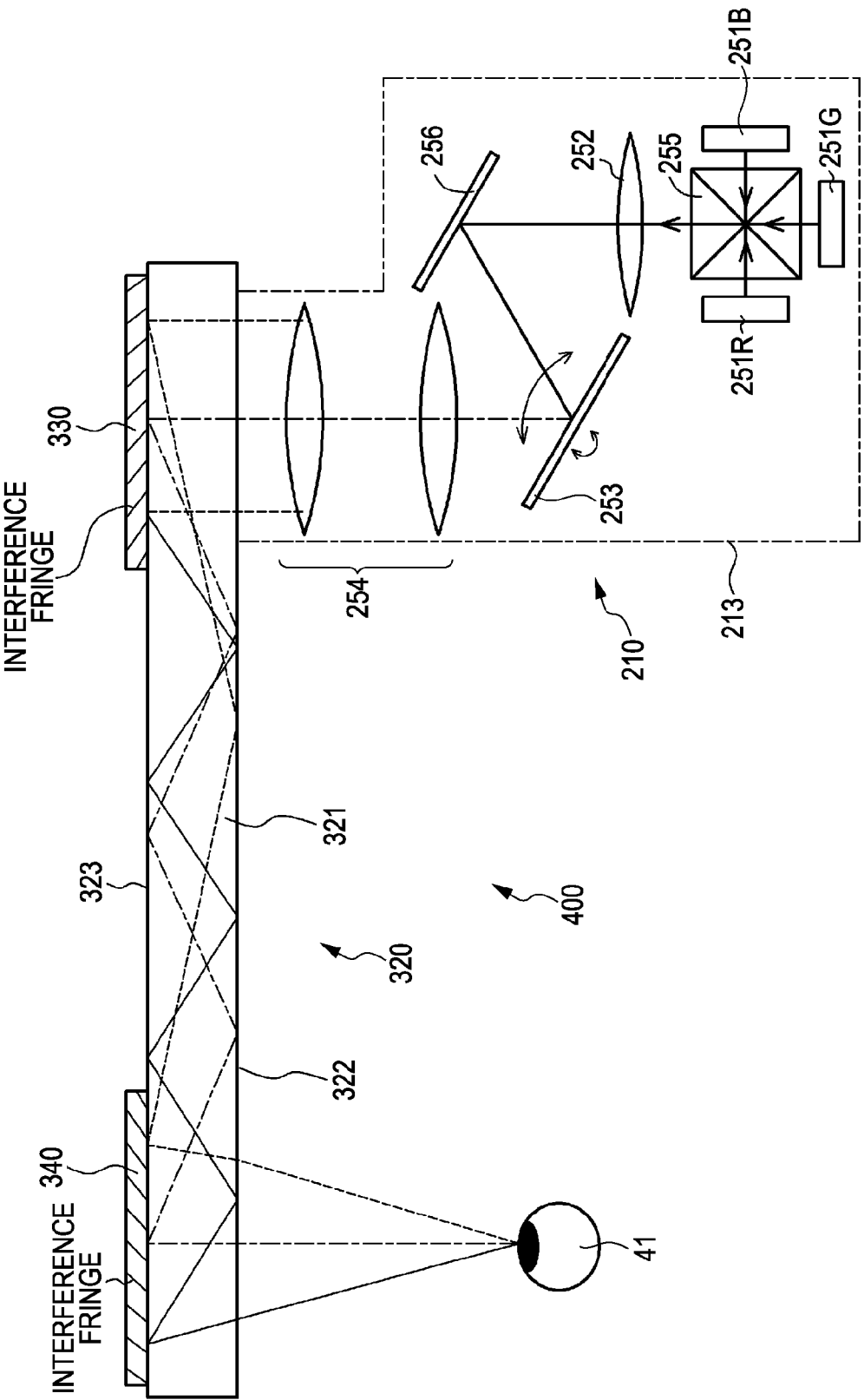
FIG. 6 is a conceptual view of an image display apparatus in a head-mounted display according to Embodiment 4.

In Embodiment 3, or Embodiment 4 or 6 that will be described below, in each of the first diffraction grating member 330 and the second diffraction grating member 340, a P-number of diffraction grating layers, each formed by a reflective volume hologram diffraction grating, are stacked to cope with diffraction and reflection of a P-number of types of light beams having a P-number of (concretely, P=3, three wavelength bands corresponding to red, green, and blue) different wavelength bands (or wavelengths). Each of the diffraction grating layers is formed of a photopolymer material by the same method as that of the related art, and is provided with interference fringes corresponding to one wavelength band (or wavelength). Specifically, in each of the first diffraction grating member 330 and the second diffraction grating member 340, a diffraction grating layer for diffracting and reflecting red light, a diffraction grating layer for diffracting and reflecting green light, and a diffraction grating layer for diffracting and reflecting blue light are stacked. The interference fringes on the diffraction grating layers (diffraction optical elements) linearly extend at a fixed pitch and parallel to the Z-axis direction. Here, the axial direction of the first diffraction grating member 330 and the second diffraction grating member 340 is designated as the Y-axis direction, and the normal direction thereof is designated as the X-axis direction. In FIGS. 5A and 6, the first diffraction grating member 330 and the second diffraction grating member 340 are each formed by only one layer. This structure can increase the diffraction efficiency and the acceptable diffraction angle and can optimize the diffraction angle when light beams having the wavelength bands (or wavelengths) are diffracted and reflected by the first diffraction grating member 330 and the second diffraction grating members 340.

FIG. 5B is an enlarged schematic partial sectional view of a reflective volume hologram diffraction grating. The reflective volume hologram diffraction grating is provided with interference fringes having a slant angle φ. Here, the slant angle φ refers to the angle formed between the surface of the reflective volume hologram diffraction grating and the interference fringes. The interference fringes are provided to extend from the inner side to the outer side of the reflective volume hologram diffraction grating, and satisfy the Bragg condition. The Bragg condition is to satisfy the following Expression A. In Expression A, m is a positive integer, λ represents the wavelength, d represents the pitch of the grating surface (distance between virtual planes including interference fringes in the normal direction), and Θ represents the supplementary angle of the incident angle on the interference fringes. When light enters the diffraction grating member at an incident angle ψ, the supplementary angle Θ, the slant angle φ, and the incident angle ψ have the relationship given by Expression B:

$$m \cdot \lambda = 2 \cdot d \cdot \sin \Theta \quad (A)$$

$$\Theta = 90° - (\phi + \psi) \quad (B)$$

As described above, the first diffraction grating member 330 is provided (bonded) on the second surface 323 of the light guide plate 321, and diffracts and reflects parallel light incident on the light guide plate 321 from the first surface 322 so that the incident parallel light is totally reflected in the light guide plate 321. Further, the second diffraction grating member 340 is provided (bonded) on the second surface 323 of the light guide plate 321. The second diffraction grating member 340 diffracts and reflects the parallel light, which propagates in the light guide plate 321 by total reflection, a plurality of times, and emits the parallel light from the light guide plate 321 through the first surface 322.

The parallel light beams of three colors, red, green, and blue, also propagate in the light guide plate 321 by total reflection, and are then emitted. In this case, since the light guide plate 321 is thin and the optical path in the light guide plate 321 is long, the number of total reflections made until the light beams reach the second diffraction grating member 340 varies according to the angle of view. More specifically, the number of reflections of parallel light that is incident at an angle such as to approach the second diffraction grating member 340, of parallel light incident on the light guide plate 321, is smaller than the number of reflections of parallel light that is incident on the light guide plate 321 at an angle such as to get away from the second diffraction grating member 340. This is because the parallel light, which is diffracted and reflected by the first diffraction grating member 330 and is incident on the light guide plate 321 at the angle such as to approach the second diffraction grating member 340, forms a smaller angle with the normal to the light guide plate 321 when the light propagating in the light guide plate 321 impinges on the inner surface of the light guide plate 321, than the parallel light that is incident on the light guide plate 321 at the angle in the opposite direction. The shape of the interference fringes provided in the second diffraction grating member 340 and the shape of the interference fringes provided in the first diffraction grating member 330 are symmetrical with respect to an imaginary plane perpendicular to the axis of the light guide plate 321.

Light guide plates 321 in Embodiments 4 and 6 that will be described below basically have the same structure as that of the above-described light guide plate 321.

As described above, the head-mounted display of Embodiment 3 substantially has the same structure as that of the head-mounted display of Embodiment 1 except that the light guide device 320 is different. Therefore, a detailed description thereof is omitted.

Embodiment 4

Embodiment 4 is a modification of Embodiment 3. FIG. 6 is a conceptual view of an image display apparatus in a head-mounted display according to Embodiment 4. In an image display apparatus 400 of Embodiment 4, a light source 251, a collimating optical system 252, a scanning member 253, a relay optical system 254, etc. have the same structures as those adopted in Embodiment 2. Further, a light guide device 320 has the same structure as that of the light guide device 320 in Embodiment 3. Since the head-mounted display of Embodiment 4 substantially has the same structure as that of the head-mounted display of Embodiment 1 except the above-described differences, a detailed description thereof is omitted.

Embodiment 5

Embodiment 5 is also a modification of the first modification. FIGS. 7A and 7B are a schematic front view and a schematic top view of a head-mounted display of Embodiment 5. In Embodiment 5, light guide devices are provided at positions closer to the center of the face of an observer 40 than image generating devices 110A and 110B. The light guide devices respectively include semitransparent mirrors 520 on which light emitted from the image generating devices 110A and 110B is incident and from which the light is emitted toward the eyes 41 of the observer 40. While the light emitted from the image generating devices 110A and 110B in Embodiment 5 enters the semitransparent mirrors 520 after propagating in transparent members 521 such as glass plates or plastic plates, it may enter the semitransparent mirrors 520 after propagating in the air. Instead of the image generating devices 110A and 110B, the image generating devices 210 in Embodiment 2 may be used.

The image generating devices 110A and 110B are attached to opposite ends of a coupling member 20, for example, with screws or an adhesive (not shown). The members 521 are respectively attached to the image generating devices 110A and 110B, and the semitransparent mirrors 520 are attached to the members 521. Since the head-mounted display of Embodiment 5 substantially has the same structure as that of the head-mounted display of Embodiment 1 except the above-described differences, a detailed description thereof is omitted.

Embodiment 6

Figure 8A:
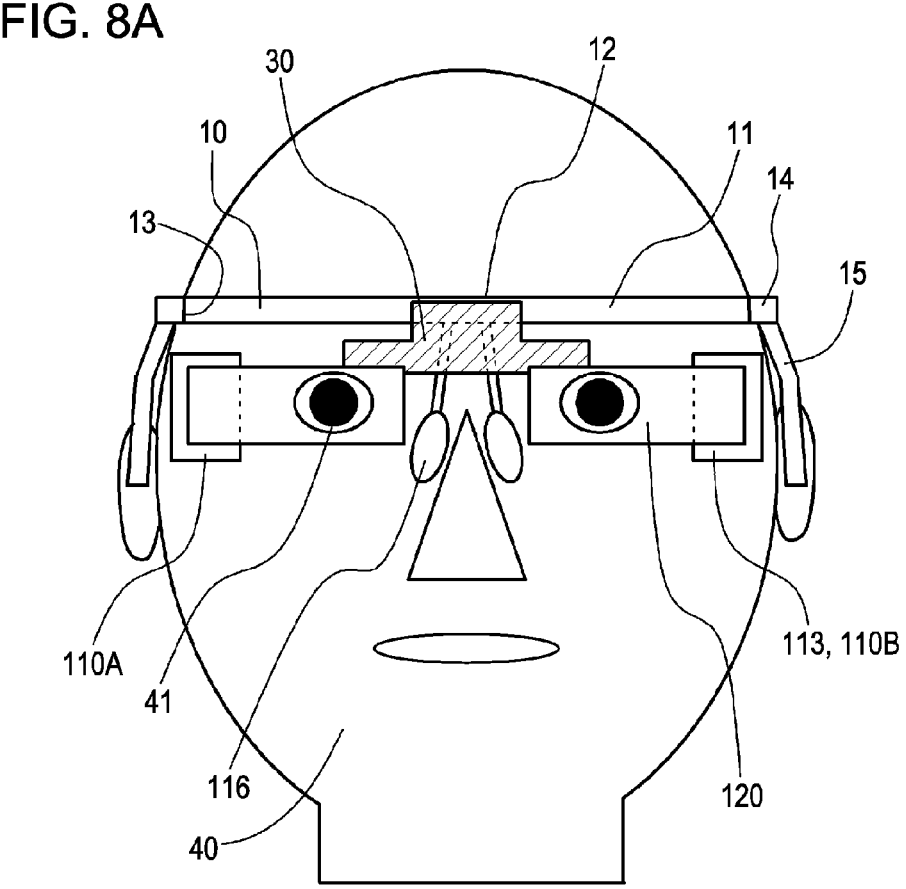
FIGS. 8A and 8B are a schematic front view and a schematic top view, respectively, of a head-mounted display according to Embodiment 6.
Figure 8B:
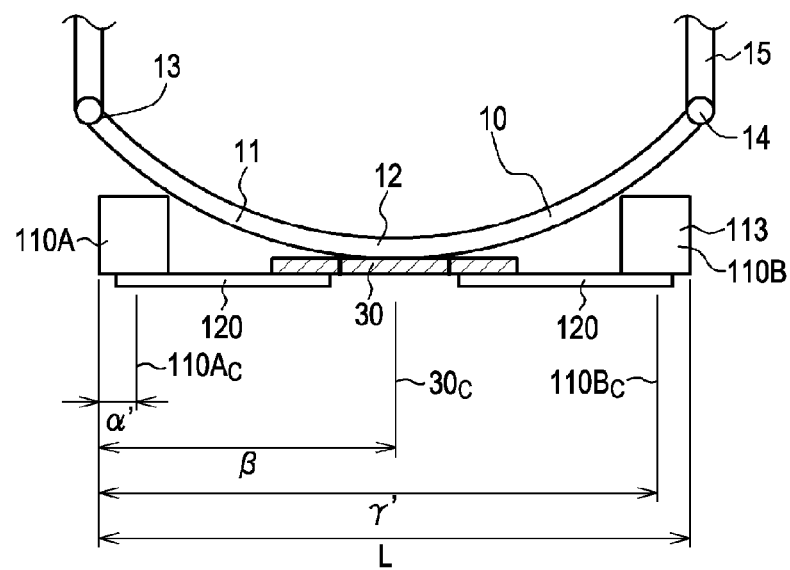

FIGS. 8A and 8B are a schematic front view and a schematic top view, respectively, of a head-mounted display according to Embodiment 6.

In the head-mounted display of Embodiment 6, unlike Embodiment 1, a rod-shaped coupling member 30 does not couple two image generating devices 110A and 110B, but couples two light guide devices 120. Alternatively, two light guide devices 120 may be combined into one, and the coupling member 30 may be attached to the combined light guide device 120.

In the head-mounted display of Embodiment 6, the coupling member 30 is attached to a center portion 12 of a frame 10 between two eyes 41 of an observer 40, for example, with screws or an adhesive (not shown), and the image generating devices 110A and 110B are provided outside the eyes 41 of the observer 40. Each of the image generating device 110A and 110B is attached to an end of the corresponding light guide device 120. Assuming that β represents the distance from the center 30C of the coupling member 30 to one end of the frame 10 and L represents the length of the frame 10, the condition that β=0.5×L is satisfied. In Embodiment 6, values α' and γ' are the same as the values α and γ in Embodiment 1.

In Embodiment 6, the frame 10, image display apparatuses 100, the image generating devices 110, the light guide devices 120 have the same structures as those of the frame 10, the image display apparatuses 100, the image generating devices 110, and the light guide device 120 in Embodiment 1. For this reason, detailed descriptions of these are omitted. Further, since the head-mounted display of Embodiment 6 substantially has the same structure as that of the head-mounted display of Embodiment 1, a detailed description thereof is omitted.

The structure of Embodiment 6 in which the rod-shaped coupling member 30 couples two light guide devices 120 can also be applied to the head-mounted displays of the above-described Embodiments 2 to 5.

While the present invention has been described above with reference to the preferred embodiments, it is not limited to these embodiments. The configurations of the image display apparatuses in the embodiments are just exemplary, and can be changed appropriately. For example, a surface relief hologram (see U.S. Patent Application Publication No. 2004/0062505 A1) may be provided in the light guide plate. The coupling member 20 or 30 may be attached not only to the center portion of the frame, but also to the nose pads 16 provided in the center portion of the frame. This further reduces displacement of the image generating devices or the light guide device. In the light guide device 120 or 320 of Embodiment 3, 4, or 6, each diffraction grating element may be formed by a transmissive diffraction grating element. Alternatively, one of the first deflecting member and the second deflecting member may be formed by a reflective diffraction grating element, and the other may be formed by a transmissive diffraction grating element. Further alternatively, the diffraction grating element may be formed by a reflective blazed diffraction grating element.

Figure 9:
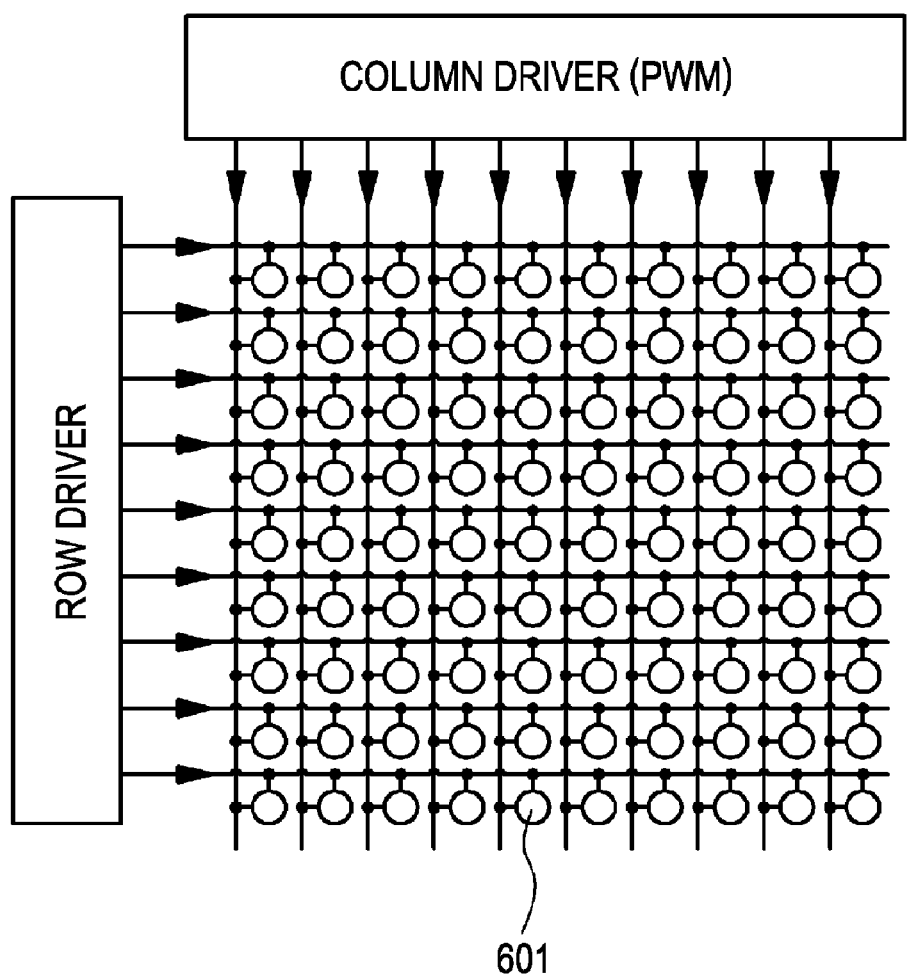
FIG. 9 is a conceptual view of a modification of an image forming device that is suitable for use in Embodiment 1, 3, 5, or 6.

As a modification of the image forming device suitably used in Embodiment 1, 3, 5, or 6, for example, an active matrix image forming device shown in FIG. 9 serving as a conceptual view can be adopted. This image forming device is formed by a light emitting panel in which semiconductor light emitting elements 601 are arranged in a two-dimensional matrix, and displays an image by controlling a light-emitting/non-light-emitting state of each light emitting element 601 so that the state of the light emitting element 601 is visible directly. Light emitted from the image forming device enters the light guide device 121 or 321 via the collimating optical system 112.

Figure 10:
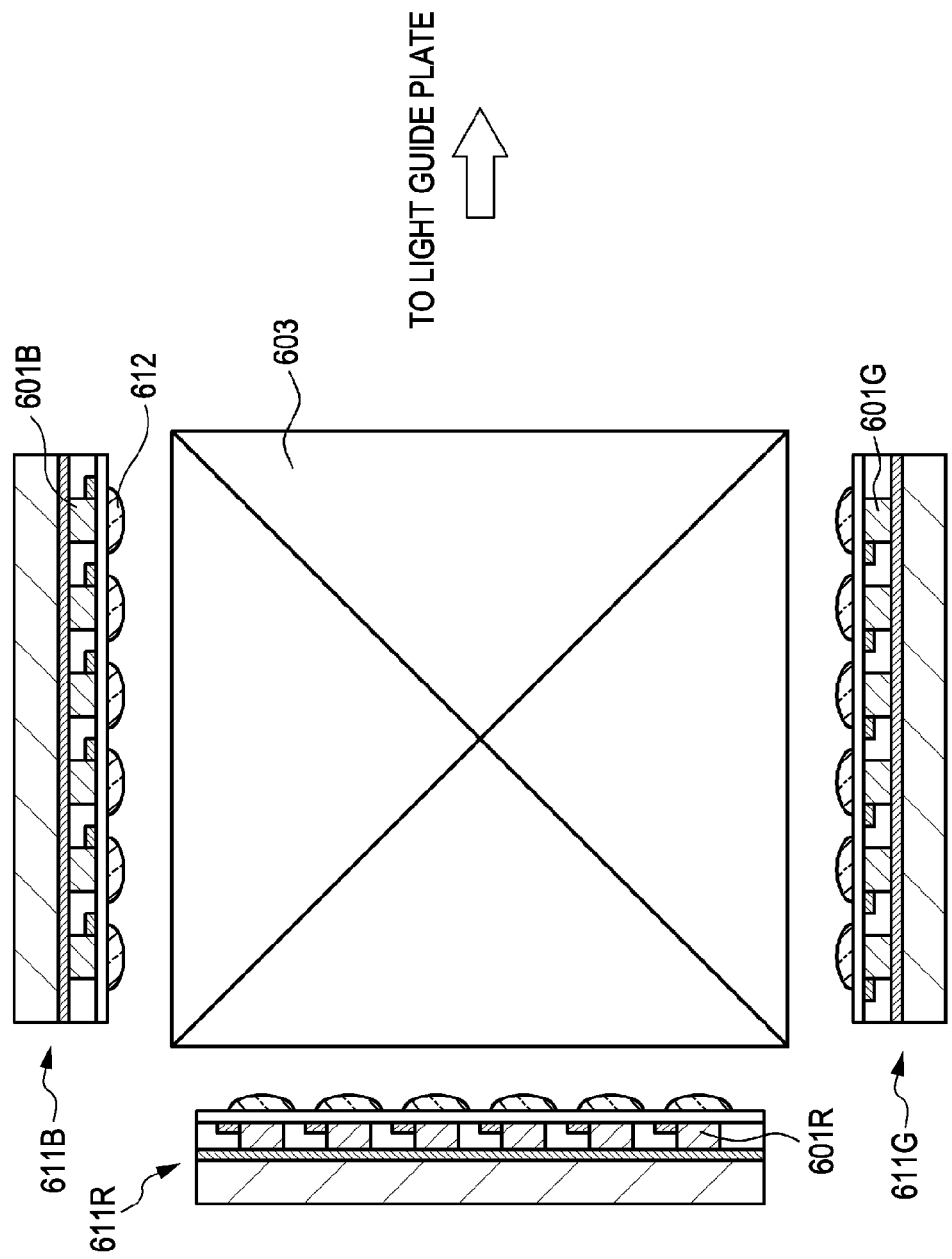
FIG. 10 is a conceptual view of another modification of an image forming device that is suitable for use in Embodiment 1, 3, 5, or 6.

Alternatively, a color display image forming device shown in FIG. 10 serving as a conceptual view can be used. The image forming device includes:

(a) a red light emitting panel 611R in which red light emitting elements 601R for emitting red light are arranged in a two-dimensional matrix;

(b) a green light emitting panel 611G in which green light emitting elements 601 G for emitting green light are arranged in a two-dimensional matrix;

(c) a blue light emitting panel 611B in which blue light emitting elements 601B for emitting blue light are arranged in a two-dimensional matrix; and (d) a combining unit that combines optical paths of light beams emitted from the red, green, and blue light emitting panels 611R, 611G, and 611B into one optical path (e.g., a dichroic prism 603).

Light-emitting/non-light-emitting states of the red, green, and blue light emitting elements 601R, 601G, and 601B are controlled independently. Light emitted from this image forming device also enters the light guide plate 121 or 321 via the collimating optical system 112. Reference numeral 612 in FIG. 10 denotes microlenses for collecting light emitted from the light emitting elements.

Figure 11:
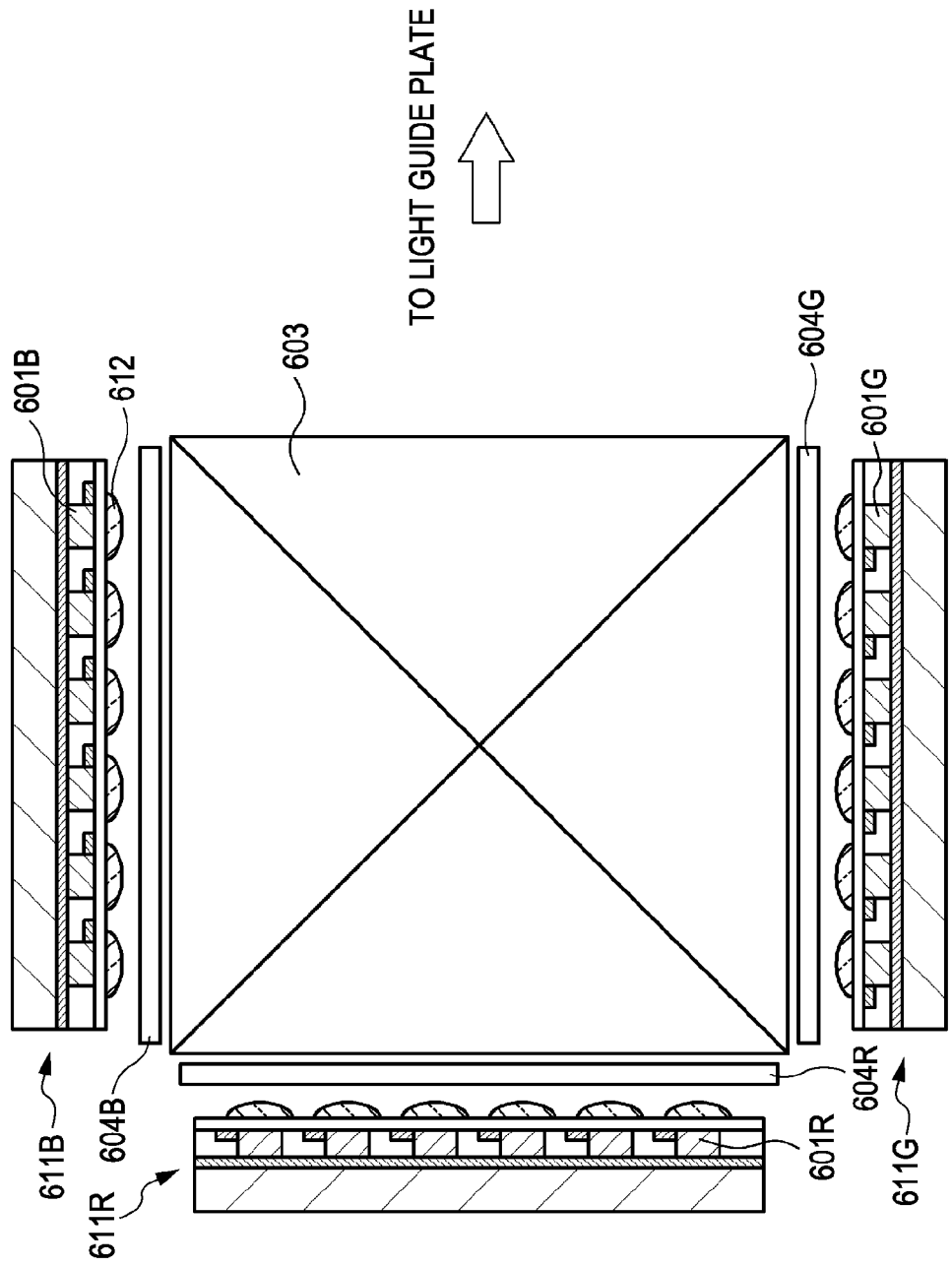
FIG. 11 is a conceptual view of a further modification of an image forming device that is suitable for use in Embodiment 1, 3, 5, or 6.

FIG. 11 is a conceptual view of another image forming device including light emitting panels 611R, 611G, and 611B in which light emitting elements 601R, 601G, and 601B are arranged in a two-dimensional matrix. Light beams emitted from the light emitting panels 611R, 611G, and 611B enter a dichroic prism 603 after transmission/non-transmission thereof is controlled by light transmission control units 604R, 604G, and 604B. The optical paths of the light beams are combined into one optical path by the dichroic prism 603, and the light beams then enter the light guide plate 121 or 321 via the collimating optical system 112.

Figure 12:
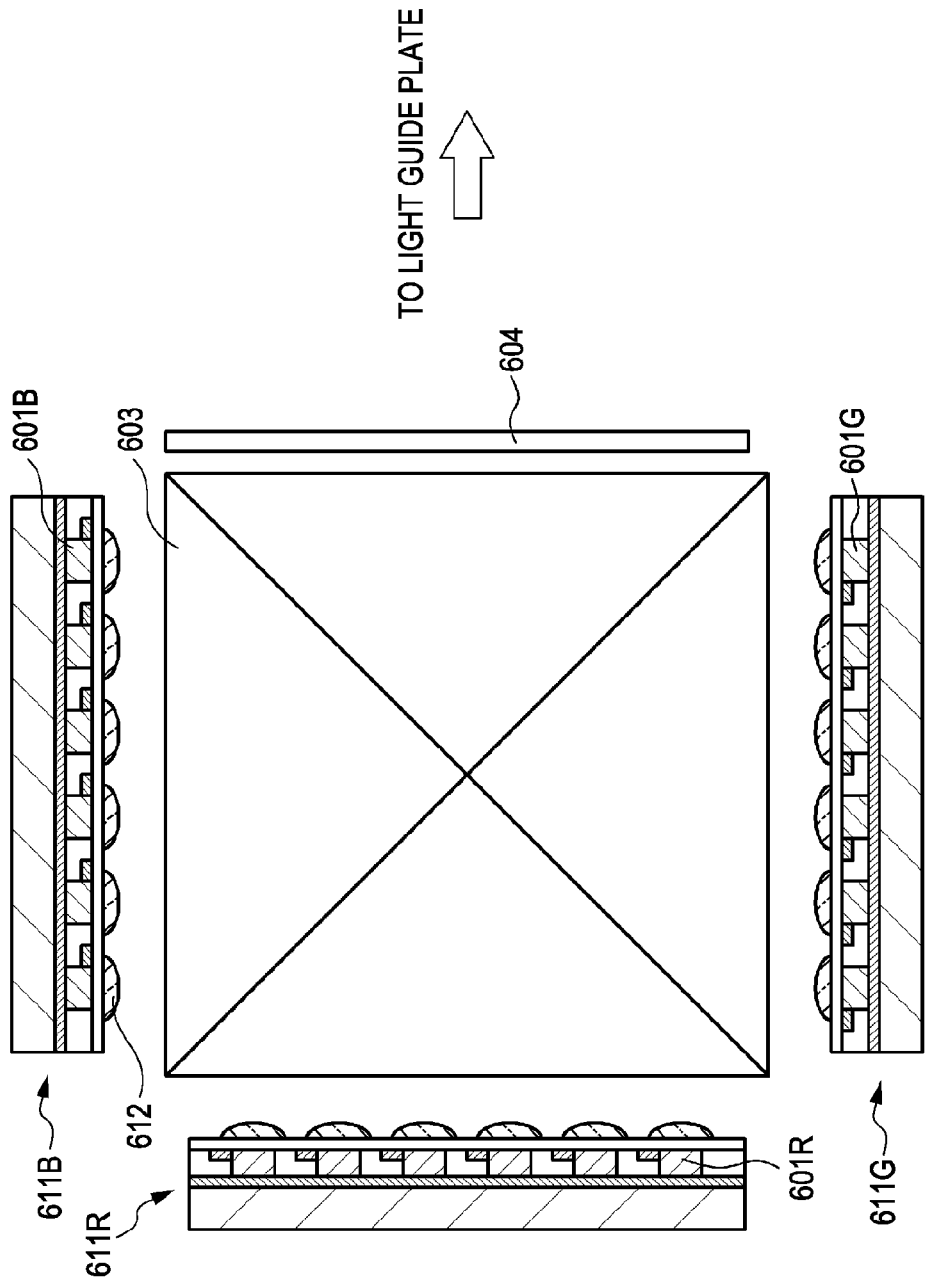
FIG. 12 is a conceptual view of a further modification of an image forming device that is suitable for use in Embodiment 1, 3, 5, or 6.

FIG. 12 is a conceptual view of a further image forming device including light emitting panels 611R, 611G, and 611B in which light emitting elements 601R, 601G, and 601B are arranged in a two-dimensional matrix. Light beams emitted from the light emitting panels 611R, 611G, and 611B enter a dichroic prism 603, where the optical paths thereof are combined into one optical path. Transmission/non-transmission of the light emitted from the dichroic prism 603 is controlled by a light transmission control unit 504, and the light then enters the light guide plate 121 or 321 via the collimating optical system 112.

Figure 13:
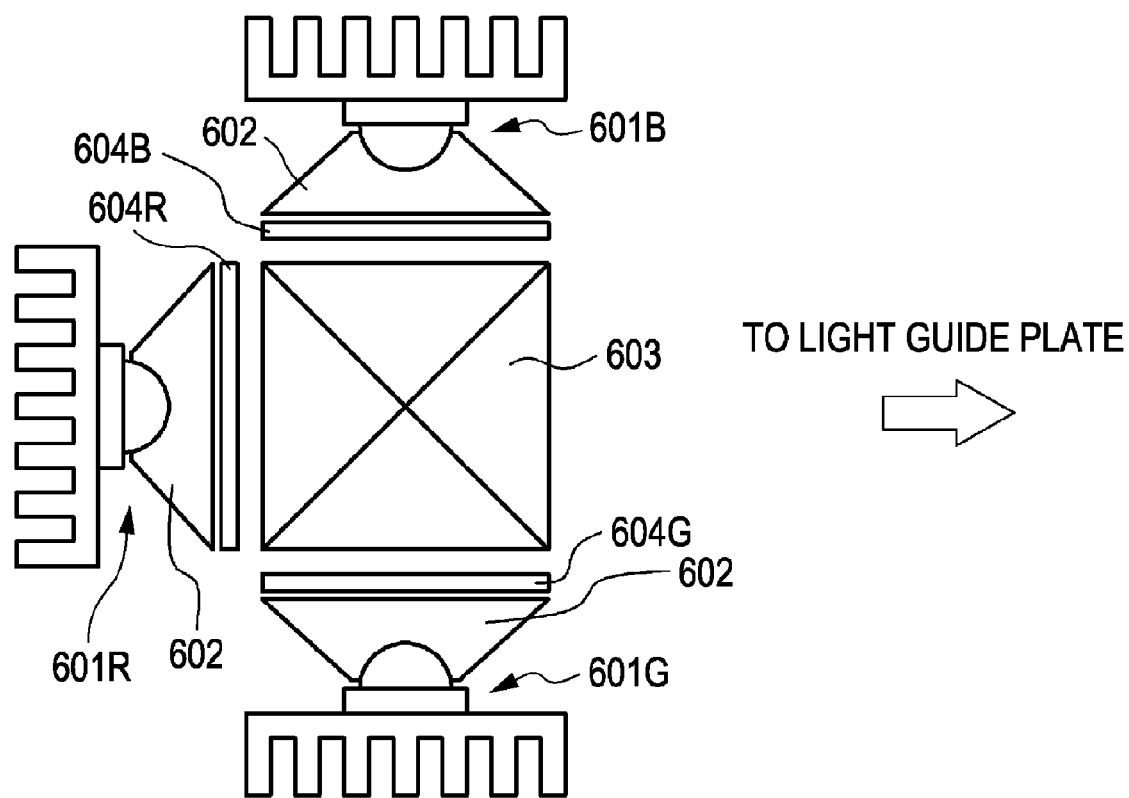
FIG. 13 is a conceptual view of a further modification of an image forming device that is suitable for use in Embodiment 1, 3, 5, or 6.
Figure 14A:
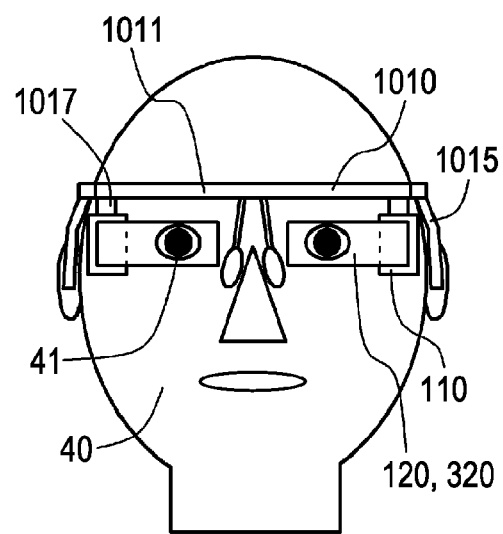
FIGS. 14A and 14B are schematic views showing a state in which image display apparatuses of the related art are attached to a frame of glasses.
Figure 14B:
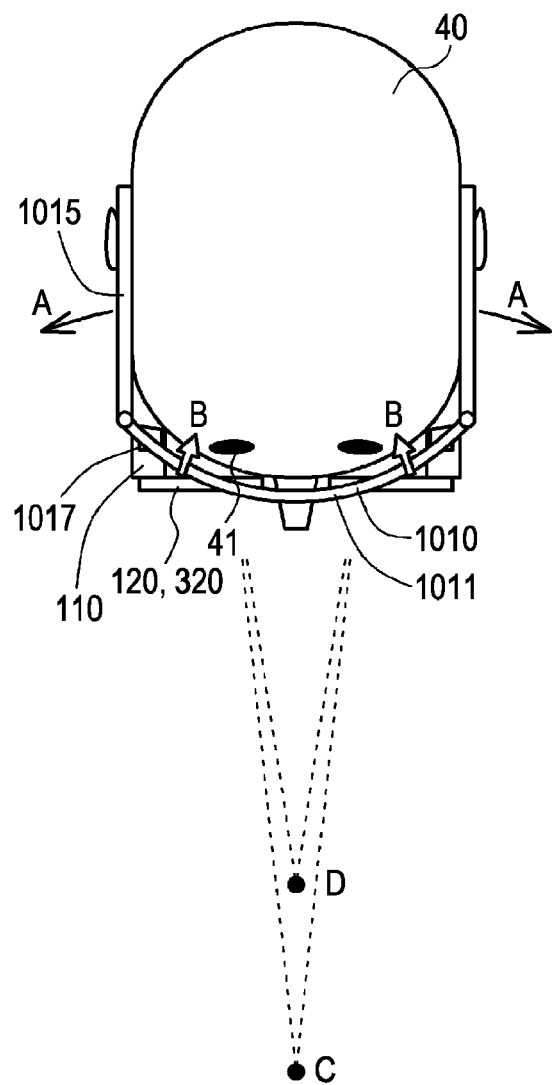

Alternatively, an image forming device shown in FIG. 13 can be used. The image forming device includes a light emitting element 601R for emitting red light, a light transmission control unit (e.g., a liquid crystal display 604R) serving as a kind of light valve for controlling transmission/non-transmission of the red light emitted from the light emitting element 601R, a light emitting element 601G for emitting green light, a light transmission control unit (e.g., a liquid crystal display 604G) serving as a kind of light valve for controlling transmission/non-transmission of the green light emitted from the light emitting element 601G, a light emitting element 601B for emitting blue light, a light transmission control unit (e.g., a liquid crystal display 604B) for controlling transmission/non-transmission of the blue light emitted from the light emitting element 601B, light guide members 602 for guiding the light emitted from the light emitting elements 601R, 601G, and 601B, and a combining unit for combining the optical paths of the light into one optical path (e.g., a dichroic prism 603). The light emitting elements 601R, 601G, and 601B are each formed of a GaN semiconductor.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A head-mounted display comprising:
a frame shaped like glasses to be worn on the head of an observer;
two image display apparatuses respectively including image generating devices to be placed outside the eyes of the observer, and light guide means attached to the image generating devices and provided closer to the center of the face of the observer than the image generating devices as a whole, light emitted from the image generating devices entering the light guide means, and being guided and emitted from the light guide means toward the eyes of the observer; and
a coupling member configured to couple the image generating devices and attached to a center portion of the frame between the eyes of the observer,
wherein the following conditions are satisfied:

$$0.01 \times L \leq \alpha \leq 0.30 \times L$$

$$0.35 \times L \leq \beta \leq 0.65 \times L, \text{ and}$$

$$0.70 \times L \leq \gamma \leq 0.99 \times L$$

where $\alpha$ represents the distance from a mount center of one of the image generating device to one end of the frame, $\beta$ represents the distance from the center of the coupling member to the one end of the frame, $\gamma$ represents the distance from a mount center of the other image generating device to the one end of the frame, and L represents the length of the frame.

2. A head-mounted display comprising:
a frame shaped like glasses to be worn on the head of an observer;
two image display apparatuses respectively including image generating devices to be placed outside the eyes of the observer, and light guide means attached to the image generating devices and provided closer to the center of the face of the observer than the image generating devices as a whole, light emitted from the image generating devices entering the light guide means, and being guided and emitted from the light guide means toward the eyes of the observer; and
a coupling member configured to couple the light guide means and attached to a center portion of the frame between the eyes of the observer,
wherein the following conditions are satisfied:

$$0.01 \times L \leq \alpha \leq 0.30 \times L$$

$$0.35 \times L \leq \beta \leq 0.65 \times L, \text{ and}$$

$$0.70 \times L \leq \gamma \leq 0.99 \times L$$

where $\alpha$ represents the distance from a mount center of one of the image generating device to one end of the frame, $\beta$ represents the distance from the center of the coupling member to the one end of the frame, $\gamma$ represents the distance from a mount center of the other image generating device to the one end of the frame, and L represents the length of the frame.

3. A head-mounted display comprising:
a frame shaped like glasses to be worn on the head of an observer;
two image display apparatuses respectively including image generating devices to be placed outside the eyes of the observer, and light guide means attached to the image generating devices and provided closer to the center of the face of the observer than the image generating devices as a whole, light emitted from the image generating devices entering the light guide means, and being guided and emitted from the light guide means toward the eyes of the observer; and
a coupling member configured to couple the image generating devices and attached to a center portion of the frame between the eyes of the observer,
wherein each of the light guide means includes:
a light guide plate which is provided closer to the center of the face of the observer than the image generating device as a whole, light emitted from the image generating device being incident on the light guide plate, and being guided and emitted from the light guide plate toward the eye of the observer;

first deflecting means configured to deflect the light incident on the light guide plate so that the incident light is totally reflected in the light guide plate; and second deflecting means configured to deflect the light, which has propagates in the light guide plate by total reflection, a plurality of times so as to emit the propagating light.

4. A head-mounted display comprising:

a frame shaped like glasses to be worn on the head of an observer;

two image display apparatuses respectively including image generating devices to be placed outside the eyes of the observer, and light guide means attached to the image generating devices and provided closer to the center of the face of the observer than the image generating devices as a whole, light emitted from the image generating devices entering the light guide means, and being guided and emitted from the light guide means toward the eyes of the observer; and a coupling member configured to couple the light guide means and attached to a center portion of the frame between the eyes of the observer, wherein each of the light guide means includes:

a light guide plate which is provided closer to the center of the face of the observer than the image generating device as a whole, light emitted from the image generating device being incident on the light guide plate, and being guided and emitted from the light guide plate toward the eye of the observer;

first deflecting means configured to deflect the light incident on the light guide plate so that the incident light is totally reflected in the light guide plate; and second deflecting means configured to deflect the light, which has propagates in the light guide plate by total reflection, a plurality of times so as to emit the propagating light.

5. The head-mounted display according to claim 3, wherein the first polarizing means reflects the light incident on the light guide plate, and the second polarizing means transmits and reflects the light, which propagates in the light guide plate by total reflection, a plurality of times.

6. The head-mounted display according to claim 4, wherein the first polarizing means reflects the light incident on the light guide plate, and the second polarizing means transmits and reflects the light, which propagates in the light guide plate by total reflection, a plurality of times.

7. The head-mounted display according to claim 5, wherein the first polarizing means functions as a reflecting mirror, and the second polarizing means functions as a semi-transmissive mirror.

8. The head-mounted display according to claim 6, wherein the first polarizing means functions as a reflecting mirror, and the second polarizing means functions as a semi-transmissive mirror.

9. The head-mounted display according to claim 3, wherein the first polarizing means diffracts the light incident on the light guide plate, and the second polarizing means diffracts the light, which propagates in the light guide plate by total reflection, a plurality of times.

10. The head-mounted display according to claim 4, wherein the first polarizing means diffracts the light incident on the light guide plate, and the second polarizing means diffracts the light, which propagates in the light guide plate by total reflection, a plurality of times.

11. The head-mounted display according to claim 9, wherein the first polarizing means and the second polarizing means are formed by diffraction grating elements.

12. The head-mounted display according to claim 10, wherein the first polarizing means and the second polarizing means are formed by diffraction grating elements.

13. The head-mounted display according to claim 11, wherein each of the diffraction grating elements is a reflective diffraction grating element.

14. The head-mounted display according to claim 12, wherein each of the diffraction grating elements is a reflective diffraction grating element.

15. The head-mounted display according to claim 11, wherein each of the diffraction grating elements is a transmissive diffraction grating element.

16. The head-mounted display according to claim 12, wherein each of the diffraction grating elements is a transmissive diffraction grating element.

17. The head-mounted display according to claim 11, wherein one of the diffraction grating elements is a reflective diffraction grating element, and the other diffraction grating element is a transmissive diffraction grating element.

18. The head-mounted display according to claim 12, wherein one of the diffraction grating elements is a reflective diffraction grating element, and the other diffraction grating element is a transmissive diffraction grating element.

19. The head-mounted display according to claim 3, wherein the light guide means are formed by semi-transmissive mirrors which are provided closer to the center of the face of the observer than the image generating devices and on which the light emitted from the image generating devices is incident and from which the light is emitted toward the eyes of the observer.

20. The head-mounted display according to Claim 4, wherein the light guide means are formed by semi-transmissive mirrors which are provided closer to the center of the face of the observer than the image generating devices and on which the light emitted from the image generating devices is incident and from which the light is emitted toward the eyes of the observer.

21. A head-mounted display comprising:

a frame shaped like glasses to be worn on the head of an observer;

two image display apparatuses respectively including image generating devices to be placed outside the eyes of the observer, and light guide means attached to the image generating devices and provided closer to the center of the face of the observer than the image generating devices as a whole, light emitted from the image generating devices entering the light guide means, and being guided and emitted from the light guide means toward the eyes of the observer; and a coupling member configured to couple the image generating devices and attached to a center portion of the frame between the eyes of the observer, wherein each of the image generating devices includes:

an image forming device having a plurality of pixels arranged in a two-dimensional matrix; and a collimating optical system configured to emit, as parallel light, light emitted from the pixels in the image forming device.

22. A head-mounted display comprising:

a frame shaped like glasses to be worn on the head of an observer;

two image display apparatuses respectively including image generating devices to be placed outside the eyes of the observer, and light guide means attached to the image generating devices and provided closer to the center of the face of the observer than the image generating devices as a whole, light emitted from the image generating devices entering the light guide means, and being guided and emitted from the light guide means toward the eyes of the observer; and a coupling member configured to couple the light guide means and attached to a center portion of the frame between the eyes of the observer, wherein each of the image generating devices includes:

an image forming device having a plurality of pixels arranged in a two-dimensional matrix; and a collimating optical system configured to emit, as parallel light, light emitted from the pixels in the image forming device.

23. A head-mounted display comprising:

a frame shaped like glasses to be worn on the head of an observer;

two image display apparatuses respectively including image generating devices to be placed outside the eyes of the observer, and light guide means attached to the image generating devices and provided closer to the center of the face of the observer than the image generating devices as a whole, light emitted from the image generating devices entering the light guide means, and being guided and emitted from the light guide means, toward the eyes of the observer; and a coupling member configured to couple the image generating devices and attached to a center portion of the frame between the eyes of the observer, wherein each of the image generating devices includes:

a light source;

a collimating optical system configured to convert light emitted from the light source into parallel light;

scanning means configured to scan the parallel light emitted from the collimating optical system; and a relay optical system configured to relay and emit the parallel light scanned by the scanning means.

24. A head-mounted display comprising:

a frame shaped like glasses to be worn on the head of an observer;

two image display apparatuses respectively including image generating devices to be placed outside the eyes of the observer, and light guide means attached to the image generating devices and provided closer to the center of the face of the observer than the image generating devices as a whole, light emitted from the image generating devices entering the light guide means, and being guided and emitted from the light guide means toward the eyes of the observer; and a coupling member configured to couple the light guide means and attached to a center portion of the frame between the eyes of the observer, wherein each of the image generating devices includes:

a light source;

a collimating optical system configured to convert light emitted from the light source into parallel light;

scanning means configured to scan the parallel light emitted from the collimating optical system; and a relay optical system configured to relay and emit the parallel light scanned by the scanning means.

25. The head-mounted display according to Claim 3, wherein the frame includes a front portion to be placed in front of the observer, and two temple portions pivotally attached to opposite ends of the front portion via hinges, and wherein the coupling member is attached, to a center portion of the front portion between the two eyes of the observer.

26. The head-mounted display according to Claim 4, wherein the frame includes a front portion to be placed in front of the observer, and two temple portions pivotally attached to opposite ends of the front portion via hinges, and wherein the coupling member is attached to a center portion of the front portion between the two eyes of the observer.

27. A head-mounted display comprising:

a frame shaped like glasses to be worn on the head of an observer;

two image display apparatuses respectively including image generating devices to be placed outside the eyes of the observer, and light guide devices attached to the image generating devices and provided closer to the center of the face of the observer than the image generating devices as a whole, light emitted from the image generating device entering the light guide devices, and being guided and emitted from the light guide devices toward the eye of the observer; and a coupling member configured to couple the image generating devices, and attached to a center portion of the frame between the eyes of the observer, wherein the following conditions are satisfied:

$$0.01 \times L \leq \alpha \leq 0.30 \times L$$

$$0.35 \times L \leq \beta \leq 0.65 \times L, \text{ and}$$

$$0.70 \times L \leq \gamma \leq 0.99 \times L$$

where $\alpha$ represents the distance from a mount center of one of the image generating device to one end of the frame, $\beta$ represents the distance from the center of the coupling member to the one end of the frame, $\gamma$ represents the distance from a mount center of the other image generating device to the one end of the frame, and L represents the length of the frame.

28. A head-mounted display comprising:

a frame shaped like glasses to be worn on the head of an observer;

two image display apparatuses respectively including image generating devices to be placed outside the eyes of the observer, and light guide devices attached to the image generating devices and provided closer to the center of the face of the observer than the image generating devices as a whole, light emitted from the image generating device entering the light guide devices, and being guided and emitted from the light guide devices toward the eye of the observer; and a coupling member configured to couple the light guide devices, and attached to a center portion of the frame between the eyes of the observer, wherein the following conditions are satisfied:

$$0.01 \times L \leq \alpha \leq 0.30 \times L$$

$$0.35 \times L \leq \beta \leq 0.65 \times L, \text{ and}$$

$$0.70 \times L \leq \gamma \leq 0.99 \times L$$

where $\alpha$ represents the distance from a mount center of one of the image generating device to one end of the frame, $\beta$ represents the distance from the center of the coupling member to the one end of the frame, $\gamma$ represents the distance from a mount center of the other image generating device to the one end of the frame, and L represents the length of the frame.

29. The head-mounted display according to claim 1, wherein the light guide means are formed by semi-transmissive mirrors which are provided closer to the center of the face of the observer than the image generating devices and on which the light emitted from the image generating devices is incident and from which the light is emitted toward the eyes of the observer.

30. The head-mounted display according to claim 2, wherein the light guide means are formed by semi-transmissive mirrors which are provided closer to the center of the face of the observer than the image generating devices and on which the light emitted from the image generating devices is incident and from which the light is emitted toward the eyes of the observer.

31. The head-mounted display according to claim 1, wherein the frame includes a front portion to be placed in front of the observer, and two temple portions pivotally attached to opposite ends of the front portion via hinges, and wherein the coupling member is attached to a center portion of the front portion between the two eyes of the observer.

32. The head-mounted display according to claim 2, wherein the frame includes a front portion to be placed in front of the observer, and two temple portions pivotally attached to opposite ends of the front portion via hinges, and wherein the coupling member is attached to a center portion of the front portion between the two eyes of the observer.

\* \* \* \* \*